(12) United States Patent
Fujishiro et al.

(10) Patent No.: US 12,543,022 B2
(45) Date of Patent: Feb. 3, 2026

(54) COMMUNICATION CONTROL METHOD, BASE STATION, AND USER EQUIPMENT

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 442 days.

(21) Appl. No.: 18/163,737

(22) Filed: Feb. 2, 2023

(65) Prior Publication Data

US 2023/0179963 A1 Jun. 8, 2023

Related U.S. Application Data

(63) Continuation of application No. PCT/JP2021/028635, filed on Aug. 2, 2021.

(Continued)

(51) Int. Cl.
*H04W 4/06* (2009.01)
*H04W 36/00* (2009.01)
(Continued)

(52) U.S. Cl.
CPC .......... *H04W 4/06* (2013.01); *H04W 36/0007* (2018.08); *H04W 74/0833* (2013.01); *H04W 76/40* (2018.02)

(58) Field of Classification Search
CPC .......... H04W 4/00; H04W 4/06; H04W 74/00; H04W 74/08; H04W 74/0833;
(Continued)

(56) References Cited

U.S. PATENT DOCUMENTS 8,064,942 B2 11/2011 Yang et al.
8,165,166 B2 4/2012 Fischer
(Continued)

FOREIGN PATENT DOCUMENTS

JP 2009-017555 A 1/2009
JP 2010-521836 A 6/2010
(Continued)

OTHER PUBLICATIONS

"3rd Generation Partnership Project; Technical Specification Group Radio Access Network; NR; NR and NG-RAN Overall Description; Stage 2", Release 16, 3GPP TS 38.300 V16.2.0, Jul. 2020, pp. 1-148.

(Continued)

*Primary Examiner* — Warner Wong
(74) *Attorney, Agent, or Firm* — Studebaker Brackett PLLC

(57) ABSTRACT

A communication control method is used in a mobile communication system for providing a multicast broadcast service (MBS) from a base station to a user equipment, and includes transmitting, by the base station configured to manage a cell, to the user equipment via an MBS control channel of the cell, MBS control information used to receive MBS data, and transmitting, by the base station to the user equipment, a control area identifier indicating an MBS control area coverage corresponding to an area coverage where at least a part of the MBS control information is applicable.

12 Claims, 18 Drawing Sheets

Related U.S. Application Data

(60) Provisional application No. 63/060,257, filed on Aug. 3, 2020.

(51) Int. Cl.
*H04W 74/0833* (2024.01)
*H04W 76/40* (2018.01)

(58) Field of Classification Search
CPC ......... H04W 36/0005; H04W 36/0007; H04W 36/026; H04W 76/40; H04L 12/18; H04L 12/1845; H04L 49/201; H04L 65/611
See application file for complete search history.

(56) References Cited

U.S. PATENT DOCUMENTS

| | | | |
|---|---|---|---|
| 9,307,520 B2 * | 4/2016 | Deng | H04W 24/02 |
| 9,497,731 B2 | 11/2016 | Shindo | |
| 9,936,481 B2 | 4/2018 | Shindo et al. | |
| 10,484,970 B2 | 11/2019 | Shindo et al. | |
| 10,880,868 B2 | 12/2020 | Adjakple et al. | |
| 2007/0253367 A1 * | 11/2007 | Dang | H04W 72/30 370/329 |
| 2008/0009283 A1 | 1/2008 | Lim et al. | |
| 2008/0146213 A1 * | 6/2008 | Kim | H04L 12/1881 455/422.1 |
| 2010/0272000 A1 * | 10/2010 | Chen | H04W 72/30 370/312 |
| 2011/0053600 A1 * | 3/2011 | Rajasimman | H04W 36/0061 455/442 |
| 2011/0058511 A1 * | 3/2011 | Kim | H04W 4/06 370/312 |
| 2011/0058512 A1 * | 3/2011 | Koo | H04L 5/0037 370/312 |
| 2011/0064016 A1 * | 3/2011 | Kim | H04W 36/0007 370/312 |
| 2011/0075600 A1 * | 3/2011 | Kim | H04W 72/30 370/312 |
| 2011/0164548 A1 * | 7/2011 | Kim | H04W 16/32 370/312 |
| 2011/0182229 A1 * | 7/2011 | Park | H04W 72/30 370/312 |
| 2012/0155367 A1 * | 6/2012 | Kim | H04W 72/30 370/312 |
| 2012/0294221 A1 * | 11/2012 | Choi | H04W 72/30 370/312 |
| 2014/0036676 A1 * | 2/2014 | Purnadi | H04W 36/0058 370/235 |
| 2014/0098733 A1 | 4/2014 | Park et al. | |
| 2016/0112877 A1 * | 4/2016 | Tseng | H04W 12/08 455/414.2 |
| 2017/0048893 A1 * | 2/2017 | Koskinen | H04W 48/10 |
| 2023/0108178 A1 * | 4/2023 | Xu | H04W 76/40 370/312 |
| 2023/0164640 A1 * | 5/2023 | Jia | H04W 76/32 370/331 |
| 2023/0180064 A1 * | 6/2023 | Fujishiro | H04W 76/40 370/331 |
| 2023/0189299 A1 * | 6/2023 | Fujishiro | H04W 4/06 370/312 |

FOREIGN PATENT DOCUMENTS

| | | | | |
|---|---|---|---|---|
| JP | 2014-123976 A | | 7/2014 | |
| JP | 2019-516310 A | | 6/2019 | |
| WO | WO-2022028288 A1 | * | 2/2022 | ............ H04W 48/16 |

OTHER PUBLICATIONS

Ericsson, "MBMS SI-Solution on MBMS service continuity", 3GPP TSG-SA WG6 Meeting #14, S6-161553, Nov. 14-18, 2016, Total 11 Pages, Reno, Nevada, USA.

"3rd Generation Partnership Project; Technical Specification Group Radio Access Network; Evolved Universal Terrestrial Radio Access (E-UTRA); Radio Resource Control (RRC); Protocol specification", Release 16, 3GPP TS 36.331 V16.1.1, Jul. 2020, Total 4 Pages.

Philips, NXP Semiconductors, "Use of RACH for e-MBMS Counting", 3GPP TSG-RAN WG2 #59bis, R2-074997, Shanghai, China, Oct. 8-12, 2007, total 3 pages.

* cited by examiner

COMMUNICATION CONTROL METHOD, BASE STATION, AND USER EQUIPMENT

RELATED APPLICATIONS

The present application is a continuation based on PCT Application No. PCT/JP2021/028635, filed on Aug. 2, 2021, which claims the benefit of U.S. Provisional Application No. 63/060,257 filed on Aug. 3, 2020. The content of which is incorporated by reference herein in their entirety.

TECHNICAL FIELD

The present disclosure relates to a communication control method, a base station, and a user equipment used in a mobile communication system.

BACKGROUND OF INVENTION

In recent years, a mobile communication system of the fifth generation (5G) has attracted attention. New Radio (NR), which is a Radio Access Technology (RAT) of the 5G System, has features such as high speed, large capacity, high reliability, and low latency compared to Long Term Evolution (LTE), which is a fourth generation radio access technology.

CITATION LIST

Non-Patent Literature

NPL 1: 3GPP Technical Specification "3GPP TS 38.300 V16.2.0 (2020 July)"

SUMMARY

A first aspect provides a communication control method used in a mobile communication system for providing a multicast broadcast service (MBS) from a base station to a user equipment, the communication control method including transmitting, by the base station configured to manage a cell, to the user equipment via an MBS control channel of the cell, MBS control information used to receive MBS data, and transmitting, by the base station to the user equipment, a control area identifier indicating an MBS control area coverage corresponding to an area coverage where at least a part of the MBS control information is applicable.

A second aspect provides a base station used in a mobile communication system for providing a multicast broadcast service (MBS), the base station including a processor configured to perform operations including transmitting MBS control information used to receive MBS data to a user equipment via an MBS control channel of a cell of a base station, and transmitting, to the user equipment, a control area identifier indicating an MBS control area coverage corresponding to an area coverage where at least a part of the MBS control information is applicable.

A third aspect provides a user equipment used in a mobile communication system providing a multicast broadcast service (MBS), the user equipment including a processor configured to perform operations including receiving, via an MBS control channel of a cell, MBS control information used to receive MBS data, receiving, from the cell, a control area identifier indicating an MBS control area coverage corresponding to an area coverage where at least a part of the MBS control information is applicable, storing the MBS control information and the control area identifier from the base station, and receiving the MBS data based on the MBS control information stored, within the MBS control area coverage indicated by the control area identifier stored.

DESCRIPTION OF EMBODIMENTS

Introduction of multicast broadcast services to the 5G system (NR) has been under study. NR multicast broadcast services are desired to provide enhanced services compared to LTE multicast broadcast services.

The present disclosure provides enhanced multicast broadcast services.

A mobile communication system according to an embodiment will be described with reference to the drawings. In the description of the drawings, the same or similar parts are denoted by the same or similar reference signs.

Configuration of Mobile Communication System

Figure 1:
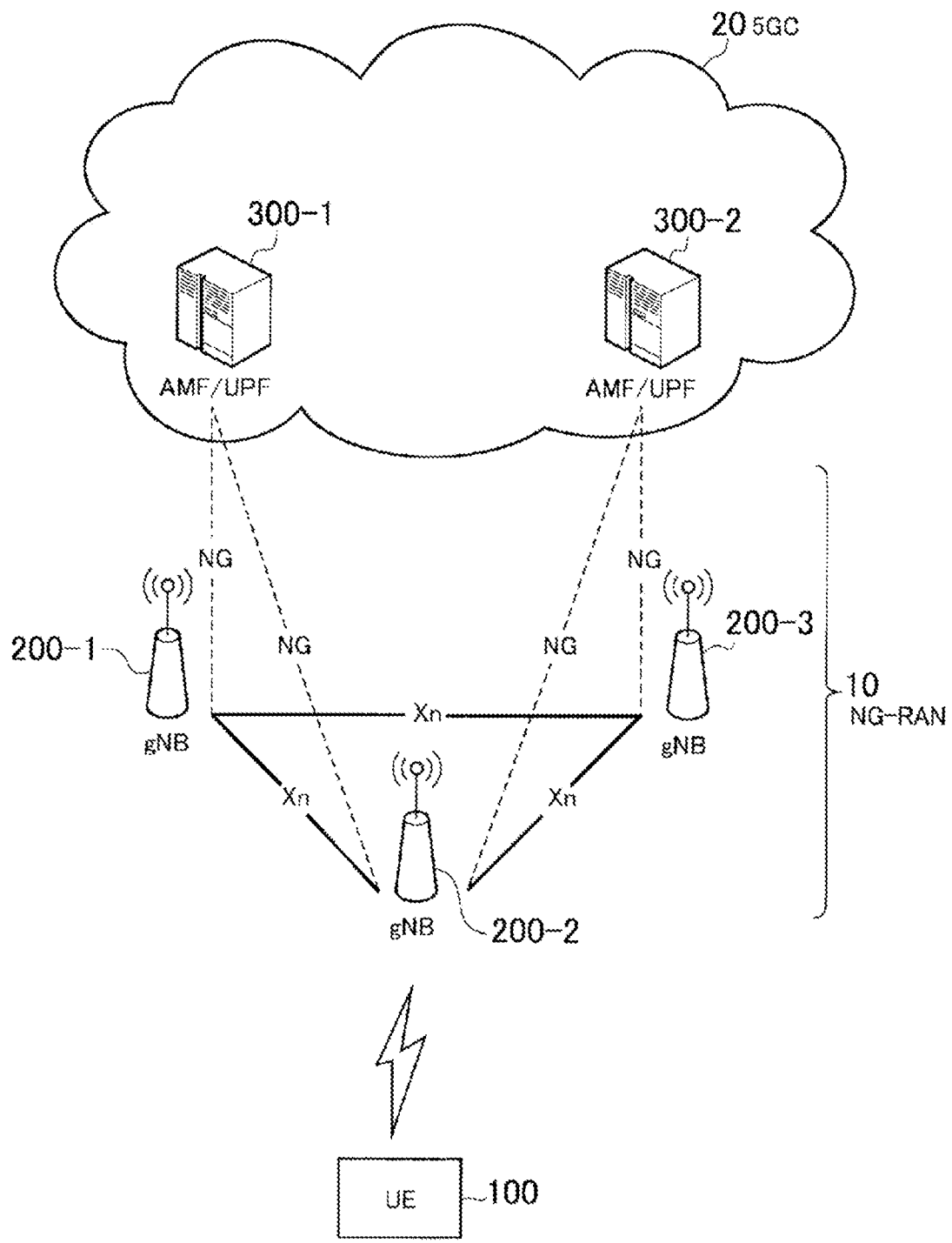
FIG. 1 is a diagram illustrating a configuration of a mobile communication system according to an embodiment.

First, a configuration of a mobile communication system according to an embodiment will be described. FIG. 1 is a diagram illustrating a configuration of the mobile communication system according to an embodiment. This mobile communication system complies with the 5th Generation System (5GS) of the 3GPP standard. The description below takes the 5GS as an example, but Long Term Evolution (LTE) system may be at least partially applied to the mobile communication system.

As illustrated in FIG. 1, the mobile communication system includes a user equipment (UE) 100, a 5G radio access network (next generation radio access network (NG-RAN)) 10, and a 5G core network (5GC) 20.

The UE 100 is a mobile wireless communication apparatus. The UE 100 may be any apparatus as long as utilized by a user. Examples of the UE 100 include a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), or a flying object or an apparatus provided on a flying object (Aerial UE).

The NG-RAN 10 includes base stations (referred to as "gNBs" in the 5G system) 200. The gNBs 200 are interconnected via an Xn interface which is an inter-base station interface. Each gNB 200 manages one or a plurality of cells. The gNB 200 performs wireless communication with the UE 100 that has established a connection to the cell of the gNB 200. The gNB 200 has a radio resource management (RRM) function, a function of routing user data (hereinafter simply referred to as "data"), a measurement control function for mobility control and scheduling, and the like. The "cell" is used as a term representing a minimum unit of a wireless communication area. The "cell" is also used as a term representing a function or a resource for performing wireless communication with the UE 100. One cell belongs to one carrier frequency.

Note that the gNB can be connected to an Evolved Packet Core (EPC) corresponding to a core network of LTE. An LTE base station can also be connected to the 5GC. The LTE base station and the gNB can be connected via an inter-base station interface.

The 5GC 20 includes an Access and Mobility Management Function (AMF) and a User Plane Function (UPF) 300. The AMF performs various types of mobility controls and the like for the UE 100. The AMF manages mobility of the UE 100 by communicating with the UE 100 by using Non-Access Stratum (NAS) signalling. The UPF controls data transfer. The AMF and UPF are connected to the gNB 200 via an NG interface which is an interface between a base station and the core network.

Figure 2:
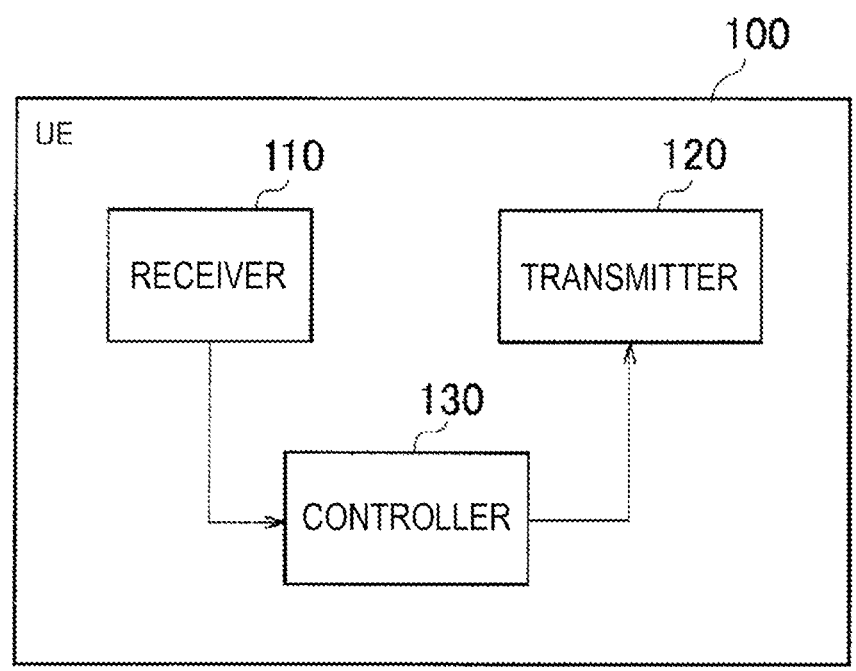
FIG. 2 is a diagram illustrating a configuration of a User Equipment (UE) according to the embodiments.

FIG. 2 is a diagram illustrating a configuration of the UE 100 (user equipment) according to an embodiment.

As illustrated in FIG. 2, the UE 100 includes a receiver 110, a transmitter 120, and a controller 130.

The receiver 110 performs various types of reception under control of the controller 130. The receiver 110 includes an antenna and a reception device. The reception device converts a radio signal received through the antenna into a baseband signal (a reception signal) and outputs the resulting signal to the controller 130.

The transmitter 120 performs various types of transmission under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various types of control in the UE 100. The controller 130 includes at least one processor and at least one memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing.

Figure 3:
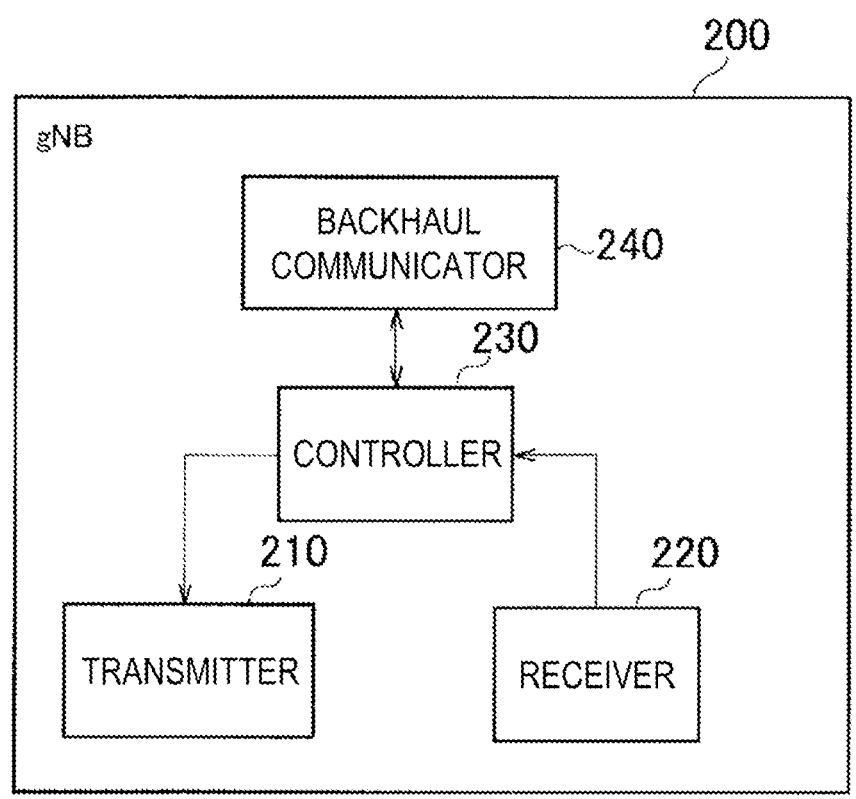
FIG. 3 is a diagram illustrating a configuration of a base station (gNB) according to the embodiments.

FIG. 3 is a diagram illustrating a configuration of the gNB 200 (base station) according to an embodiment.

As illustrated in FIG. 3, the gNB 200 includes a transmitter 210, a receiver 220, a controller 230, and a backhaul communicator 240.

The transmitter 210 performs various types of transmission under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various types of reception under control of the controller 230. The receiver 220 includes an antenna and a reception device. The reception device converts a radio signal received through the antenna into a baseband signal (a reception signal) and outputs the resulting signal to the controller 230.

The controller 230 performs various types of controls for the gNB 200. The controller 230 includes at least one processor and at least one memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing.

The backhaul communicator 240 is connected to a neighboring base station via the inter-base station interface. The backhaul communicator 240 is connected to the AMF/UPF 300 via the interface between a base station and the core network. Note that the gNB may include a Central Unit (CU) and a Distributed Unit (DU) (i.e., functions are divided), and both units may be connected via an F1 interface.

Figure 4:
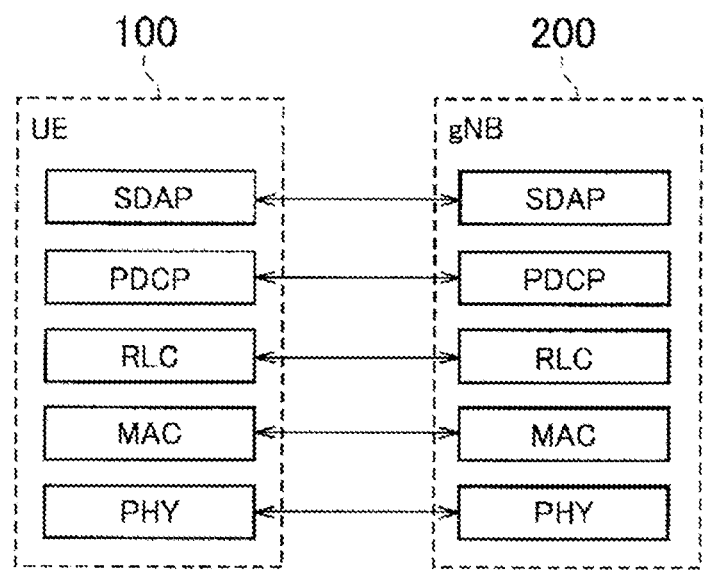
FIG. 4 is a diagram illustrating a configuration of a protocol stack of a radio interface of a user plane handling data.

FIG. 4 is a diagram illustrating a configuration of a protocol stack of a radio interface of a user plane handling data.

As illustrated in FIG. 4, a radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel.

The MAC layer performs preferential control of data, retransmission processing using a hybrid ARQ (HARD), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, modulation and coding schemes (MCSs)) in the uplink and the downlink and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression and decompression, and encryption and decryption.

The SDAP layer performs mapping between an IP flow as the unit of QoS control by a core network and a radio bearer as the unit of QoS control by an access stratum (AS). Note that, when the RAN is connected to the EPC, the SDAP need not be provided.

Figure 5:
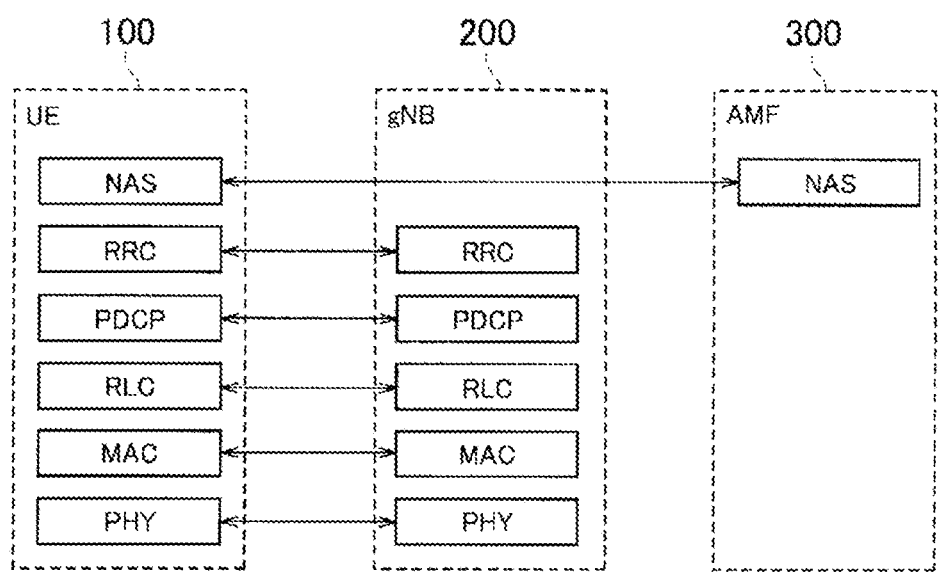
FIG. 5 is a diagram illustrating a configuration of a protocol stack of a radio interface of a control plane handling signalling (control signal).

FIG. 5 is a diagram illustrating a configuration of a protocol stack of a radio interface of a control plane handling signalling (control signal).

As illustrated in FIG. 5, the protocol stack of the radio interface of the control plane includes a Radio Resource Control (RRC) layer and a Non-Access Stratum (NAS) layer instead of the SDAP layer illustrated in FIG. 4.

RRC signalling for various configurations is transmitted between the RRC layer of the UE 100 and the RRC layer of the gNB 200. The RRC layer controls a logical channel, a transport channel, and a physical channel according to establishment, reestablishment, and release of a radio bearer. When a connection between the RRC of the UE 100 and the RRC of the gNB 200 (RRC connection) exists, the UE 100 is in an RRC connected state. When a connection between the RRC of the UE 100 and the RRC of the gNB 200 (RRC connection) does not exist, the UE 100 is in an RRC idle state. When the connection between the RRC of the UE 100 and the RRC of the gNB 200 is suspended, the UE 100 is in an RRC inactive state.

The NAS layer which is higher than the RRC layer performs session management, mobility management, and the like. NAS signalling is transmitted between the NAS layer of the UE 100 and the NAS layer of the AMF 300.

Note that the UE 100 includes an application layer other than the protocol of the radio interface.

MBS

An MBS according to an embodiment will be described. The MBS is a service in which the NG-RAN 10 provides broadcast or multicast, that is, point-to-multipoint (PTM) data transmission to the UE 100. The MBS may be referred to as the Multimedia Broadcast and Multicast Service (MBMS). Note that use cases (service types) of the MBS include public communication, mission critical communication, V2X (Vehicle to Everything) communication, Ipv4 or Ipv6 multicast delivery, IPTV, group communication, and software delivery.

Figure 6:
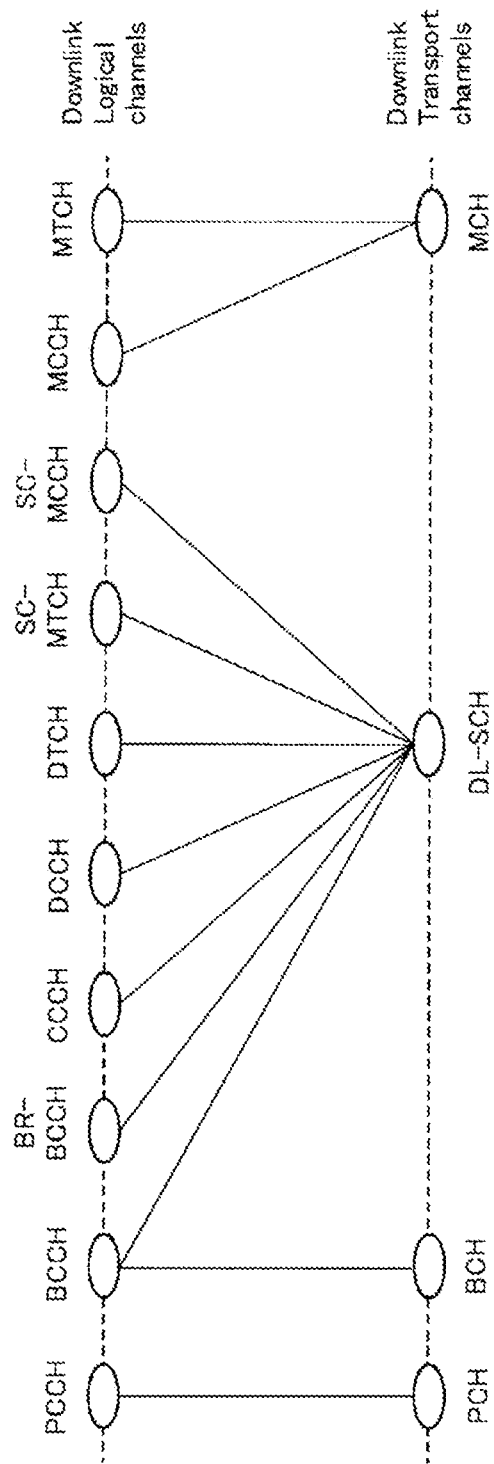
FIG. 6 is a diagram illustrating a correspondence relationship between a downlink Logical channel and a downlink Transport channel according to an embodiment.

MBS Transmission in LTE includes two schemes, i.e., a Multicast Broadcast Single Frequency Network (MBSFN) transmission and Single Cell Point-To-Multipoint (SC-PTM) transmission. FIG. 6 is a diagram illustrating a correspondence relationship between a downlink Logical channel and a downlink Transport channel according to an embodiment.

As illustrated in FIG. 6, the logical channels used for MBSFN transmission are a Multicast Traffic Channel (MTCH) and a Multicast Control Channel (MCCH), and the transport channel used for MBSFN transmission is a Multicast Control Channel (MCH). The MBSFN transmission is designed primarily for multi-cell transmission, and in an MBSFN area including a plurality of cells, each cell synchronously transmits the same signal (the same data) in the same MBSFN subframe.

The logical channels used for SC-PTM transmission are a Single Cell Multicast Traffic Channel (SC-MTCH) and a Single Cell Multicast Control Channel (SC-MCCH), and the transport channel used for SC-PTM transmission is a Downlink Shared Channel (DL-SCH). The SC-PTM transmission is primarily designed for single-cell transmission, and corresponds to broadcast or multicast data transmission on a cell-by-cell basis. The physical channels used for SC-PTM transmission are a Physical Downlink Control Channel (PDCCH) and a Physical Downlink Control Channel (PDSCH), and enables dynamic resource allocation.

Although an example will be mainly described below in which the MBS is provided using the SC-PTM transmission scheme, the MBS may be provided using the MBSFN transmission scheme. An example will be mainly described in which the MBS is provided using multicast. Accordingly, the MBS may be interpreted as multicast. Note that, the MBS may be provided using broadcast.

In the following, MBS data refers to data transmitted by the MBS. An MBS control channel refers to the MCCH or SC-MCCH, and an MBS traffic channel refers to the MTCH or SC-MTCH.

The network can provide different MBS services for respective MBS sessions. The MBS service is identified by Temporary Mobile Group Identity (TMGI) and/or a session identifier, and at least one of these identifiers is referred to as an MBS service identifier. Such an MBS service identifier may be referred to as an MBS session identifier or a multicast group identifier.

Operations of Mobile Communication System

Given the configuration of the mobile communication system and the MBS described above, operations of the mobile communication system according to an embodiment will be described.

The UE 100 that performs the MBS reception may move across cells. For the UE 100 as described above to continue the MBS reception, a switching destination cell needs to receive an MBS control channel (MBS control information) at least during cell switching. This leads to problems such as increase in load on and power consumption of the UE 100 and difficulty in promptly receiving MBS data from the switching destination cell.

An embodiment introduces a function (hereinafter referred to as "control area function") to enable MBS control information to be made common within an area coverage including a plurality of cells (hereinafter referred to as "MBS control area coverage"). Thus, the same MBS control information can be used even across the plurality of cells within an MBS control area coverage, allowing the above-described problems to be solved.

In other words, the gNB 200 according to an embodiment transmits, to the UE 100, MBS control information used to receive MBS data via an MBS control channel of the cell of the gNB 200. The gNB 200 transmits, to the UE 100, a control area identifier indicating the MBS control area coverage where at least a part of the MBS control information is applicable. Thus, the UE 100 can recognize the MBS control area coverage within which the MBS control information of the current cell can be used.

The UE 100 stores the MBS control information and control area identifier from the gNB 200. The UE 100 receives the MBS data based on the stored MBS control information, within the MBS control area coverage indicated by the stored control area identifier. As described above, the same MBS control information can be used even across the plurality of cells within the stored area coverage and the MBS data can be received. This enables increase in load on and power consumption of the UE 100 to be suppressed, and allows the MBS data to be promptly received from a switching destination cell.

Figure 7:
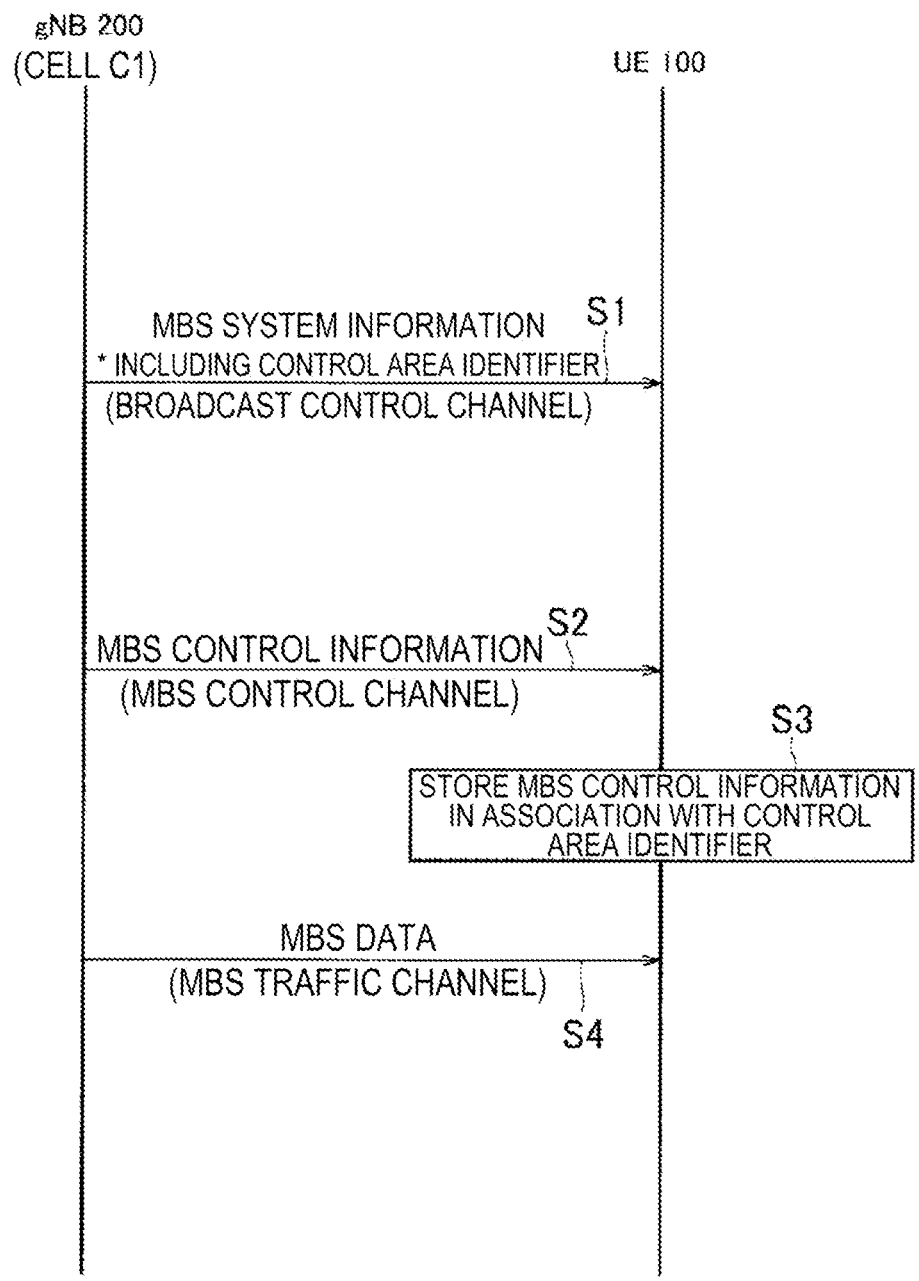
FIG. 7 is a diagram illustrating operations a mobile communication system according to an embodiment.

FIG. 7 is a diagram illustrating operations of a mobile communication system according to an embodiment.

As illustrated in FIG. 7, in step S1, the gNB 200 managing a cell C1 transmits MBS system information to the UE 100 via a Broadcast Control Channel (BCCH) of the cell C1. The MBS system information is transmitted by broadcast using a predetermined Radio Network Temporary Identifier (RNTI). The UE 100 receives the MBS system information. Note that the system information may be referred to as System Information Blocks (SIBs).

The MBS system information includes scheduling information required for receiving the MBS control channel. For example, the MBS system information includes at least one selected from the group consisting of information indicating a periodicity at which the content (MBS control information) of the MBS control channel may be changed, information indicating the time interval of the MBS control channel transmission in terms of the number of radio frames, information indicating an offset of the radio frame in which the MBS control channel is scheduled, and information indicating a subframe in which the MBS control channel is scheduled.

In an embodiment, the MBS system information further includes an MBS control area configuration. The MBS control area configuration includes an information element (hereinafter referred to as "applicability flag") indicating whether the control area function is applicable for the cell C1. When the control area function is applicable for the cell C1, the MBS system information includes the control area identifier. Note that, when the MBS system information is present, this is assumed to implicitly indicate that the control area function is applicable, and the applicability flag need not be present.

The MBS control area configuration may include expiration date information indicating a period in which the MBS control area configuration is valid (e.g., the configuration is valid until a certain radio frame, valid until a certain time, or valid from a certain time to a certain time). Note that, after the expiration date is passed, neighbor cells constituting the MBS control area coverage may change the MBS control information of the cells. Such change may be implemented by an apparatus used by an operator, by the core network, or by signaling between the gNBs 200.

Note that the control area function may be limited in that the control area function can be enabled only when a Single Frequency Network (SFN) includes a plurality of cells including the cell C1. SFN refers to a network where a plurality of cells operated at the same frequency simultaneously transmits the same signal. The UE 100 receives a signal (synthesized signal) from the plurality of cells without identifying which cell has transmitted the signal. The control area function may be enabled for MBS control channels constituting the SFN.

The control area identifier and a system information area identifier indicating the system information area coverage may be used in common. The system information area coverage refers to an area coverage where the same MBS system information can be used. When the control area identifier and the system information area identifier are used in common, the MBS system information may include information indicating that the MBS control information conforms to the configuration of the area coverage in the MBS system information. That is, this information indicates that the system information area identifier is treated as a control area identifier.

Cell C1 may include a plurality of MBS control channels. For example, each MBS service or each MBS service category may be provided with an MBS control channel. In this case, the MBS system information may include an MBS control area configuration for each MBS control channel. The MBS system information may include an MBS service identifier and/or an MBS control channel identifier, and an MBS control area configuration associated with the identifier. Instead of or in addition to the MBS control area configuration, a network slice identifier associated with the MBS control channel may be included in the MBS system information.

The UE 100 recognizes the scheduling of the MBS control channel based on the MBS system information received from the gNB 200 in step S1. The UE 100 stores the MBS control area configuration included in the MBS system information.

In step S2, the gNB 200 transmits MBS control information via the MBS control channel with the scheduling in accordance with the MBS system information transmitted in step S1. The MBS control information is transmitted by broadcast (or multicast) using a predetermined RNTI.

The MBS control information includes a list of scheduling information for MBS traffic channels. The MBS traffic channel is provided for each MBS service. The scheduling information for the MBS traffic channel includes, for example, an MBS service identifier (e.g., TMGI) and a group RNTI corresponding to the MBS traffic channel, and scheduling information (Discontinuous Reception (DRX) information) for the MBS traffic channel. Group RNTIs are mapped to MBS service identifiers on a one-to-one basis.

In step S3, the UE 100 stores the MBS control information received from the gNB 200 in step S2 in association with the MBS control area configuration (at least the control area identifier) included in the MBS control information received from the gNB 200 in step S1. The UE 100 recognizes the scheduling of the MBS traffic channel based on the MBS control information received from the gNB 200 in step S2. For example, the UE 100 recognizes the scheduling of the MBS traffic channel corresponding to the MBS service in which the UE 100 takes interest, and attempts to receive the MBS traffic channel.

In step S4, the gNB 200 transmits MBS data via the MBS traffic channel, with the scheduling in accordance with the MBS control information transmitted in step S2. The MBS data is transmitted by multicast (or broadcast) using the group RNTI. The UE 100 receives the MBS data of the MBS traffic channel corresponding to the MBS service in which the UE 100 takes interest.

Figure 8:
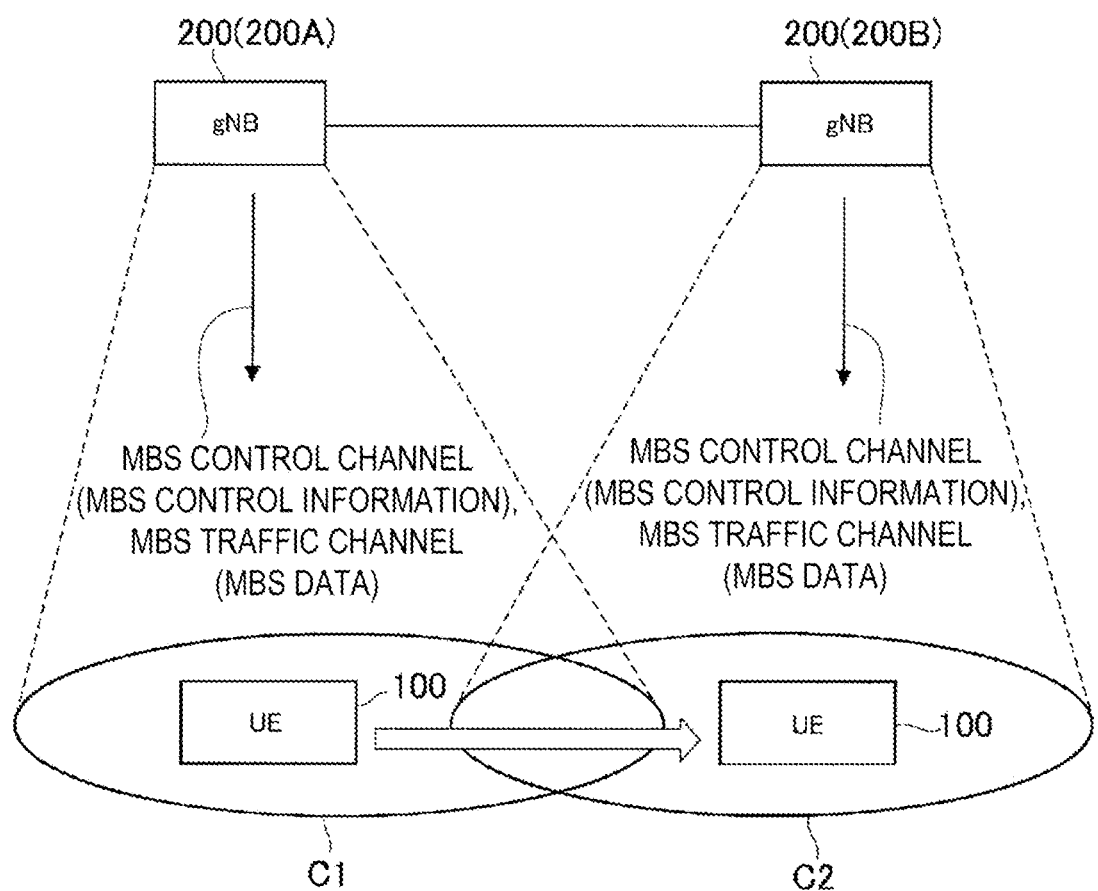
FIG. 8 is a diagram illustrating operations performed when the UE moves from a cell C1 to a cell C2 according to an embodiment.

A case will be described below in which the UE 100 moves from the cell C1 to a cell C2 corresponding to another cell (neighbor cell) after the operation described above. FIG. 8 is a diagram illustrating operations performed when the UE 100 moves from the cell C1 to the cell C2 according to an embodiment. FIG. 8 illustrates an example in which the cell C1 is managed by a gNB 200A and the cell C2 is managed by a gNB 200B.

As illustrated in FIG. 8, the UE 100 performs handover or cell reselection when moving from the cell C1 to the cell C2. The handover refers to a cell switching operation of the UE 100 in the RRC connected state. The cell reselection refers to a cell switching operation of the UE 100 in the RRC idle state or the RRC inactive state.

In the cell C1, the UE 100 stores the MBS control information of the cell C1 in association with the control area identifier (see step S3 in FIG. 7). Before cell switching from the cell C1 to the cell C2, the UE 100 receives the MBS system information transmitted by the broadcast control channel of the cell C2, and acquires the MBS control area configuration in the MBS system information.

Here, when an applicability flag in the MBS control area configuration acquired is on (i.e., the control area function is applicable for the cell C2), the UE 100 determines whether the control area identifier in the MBS control area configuration acquired (the control area identifier of the cell C2) matches the control area identifier stored in the UE 100 (the control area identifier of the cell C1). When the control area identifiers match, the UE 100 determines that the MBS control information stored in the UE 100 (the MBS control information of the cell C1) is valid, and does not receive (skips) the MBS control channel of the cell C2. Based on the MBS control information stored in the UE 100 (the MBS control information of the cell C1), the UE 100 attempts to receive the MBS traffic channel of the cell C2, and receives the MBS data from the cell C2.

As described above, upon reading the system information of the cell C2 to determine that the MBS control area coverage is identical, the UE 100 can determine that the MBS control information of the cell C1 is valid in the cell C2, and can attempt to receive the MBS traffic channel of the cell C2 without receiving the MBS control channel of the cell C2. This reduces the time during which the MBS reception is suspended.

Figure 9:
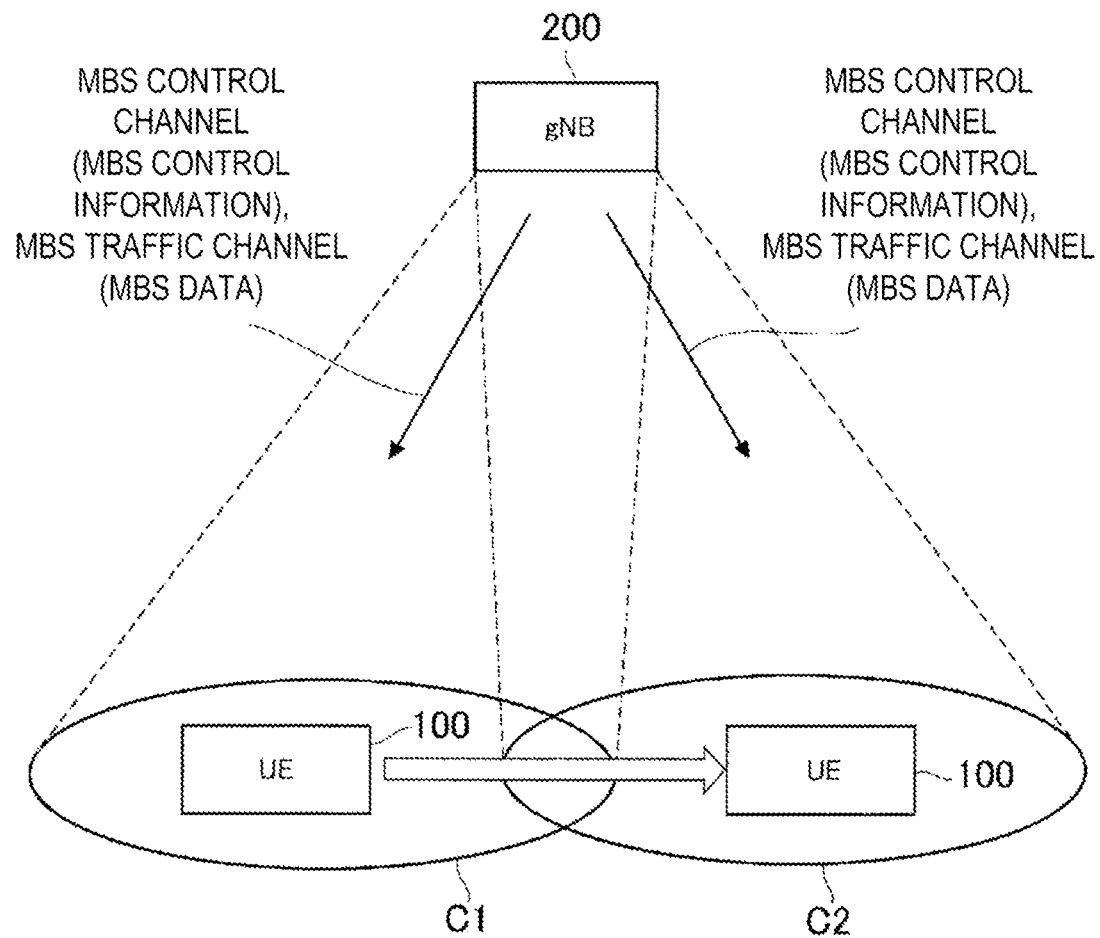
FIG. 9 is a diagram illustrating another example of a case where the UE moves from the cell C1 to the cell C2 according to an embodiment.

Note that in the example illustrated in FIG. 8, an example is described in which the cell C1 and the cell C2 are managed by separate gNBs 200, but that both the cell C1 and the cell C2 may be managed by the same gNB 200 as illustrated in FIG. 9.

As illustrated in FIGS. 8 and 9, when moving from the cell C1 to the cell C2, the UE 100 may perform the operation of acquiring the control area identifier of the cell C2 before moving to the cell C2 while performing the MBS reception from the cell C1. When the UE 100 is assumed to include only one reception device, the operation as described above may be difficult. For example, the UE 100 needs to temporarily suspend the MBS reception from cell C1 and to acquire the control area identifier of the cell C2.

Thus, the gNB 200 (cell C1) may transmit, to the UE 100, neighbor cell information to determine whether the cell C2 (neighbor cell) belongs to the same MBS control area coverage as the cell C1. The UE 100 can recognize whether the cell C2 (neighbor cell) belongs to the same MBS control area coverage as the cell C1 based on the neighbor cell information from the cell C1. For example, after receiving and storing the neighbor cell information, the UE 100 determines whether to acquire the MBS control information from the neighbor cell during cell switching. For example, when the cell C2 (neighbor cell) belongs to the same MBS control area coverage as the cell C1, the UE 100 does not acquire (skips) the control area identifier of the cell C2.

The gNB 200 (cell C1) may transmit the neighbor cell information in the MBS system information via the broadcast control channel of the cell C1, or may transmit the neighbor cell information via the MBS control channel of the cell C1.

The neighbor cell information includes the control area identifier of neighbor cell (cell C2). The neighbor cell information may include a cell identifier and/or frequency identifier and/or an MBS service identifier of the neighbor cell (cell C2) and a control area identifier associated with the identifier. When the cell C2 is provided with a plurality of MBS control channels, the neighbor cell information may include the MBS control channel identifier and the control area identifier associated with the identifier. The neighbor cell information may be limited to a neighbor cell belonging to an MBS control area coverage the same as or different from that of the cell C1 and may include the cell identifier and/or frequency identifier of the neighbor cell. The neighbor cell information may further include a system information area identifier indicating a system information area coverage of the neighbor cell.

Variation 1

Variation 1 will be described while focusing on differences from the above-described embodiment.

In the embodiment described above, the UE 100 needs to receive MBS control information from the cell C2 when the cell C2 (neighbor cell) does not belong to the same MBS control area coverage as the cell C1.

In Variation 1, the gNB 200 (cell C1) transmits, in the cell C1, the MBS control information transmitted in the neighbor cell when the MBS control area coverage to which the cell C1 belongs is different from the MBS control area coverage to which the neighbor cell belongs. Thus, the UE 100 in the cell C1 can acquire the MBS control information of the neighbor cell before moving to the neighbor cell. Accordingly, upon moving to the neighbor cell, the UE 100 can promptly receive the MBS data from the neighbor cell based on the MBS control information acquired in advance.

The gNB 200 (cell C1) may transmit the MBS control information of the neighbor cell via the broadcast control channel of the cell C1, or may transmit the MBS control information of the neighbor cell via the MBS control channel of the cell C1.

Note that when the MBS control area coverage to which the cell C1 belongs is the same as the MBS control area coverage to which the neighbor cell belongs, the gNB 200 (cell C1) may transmit, in the cell C1, neighbor cell information about the neighbor cell as in the above-described embodiment.

Figure 10:
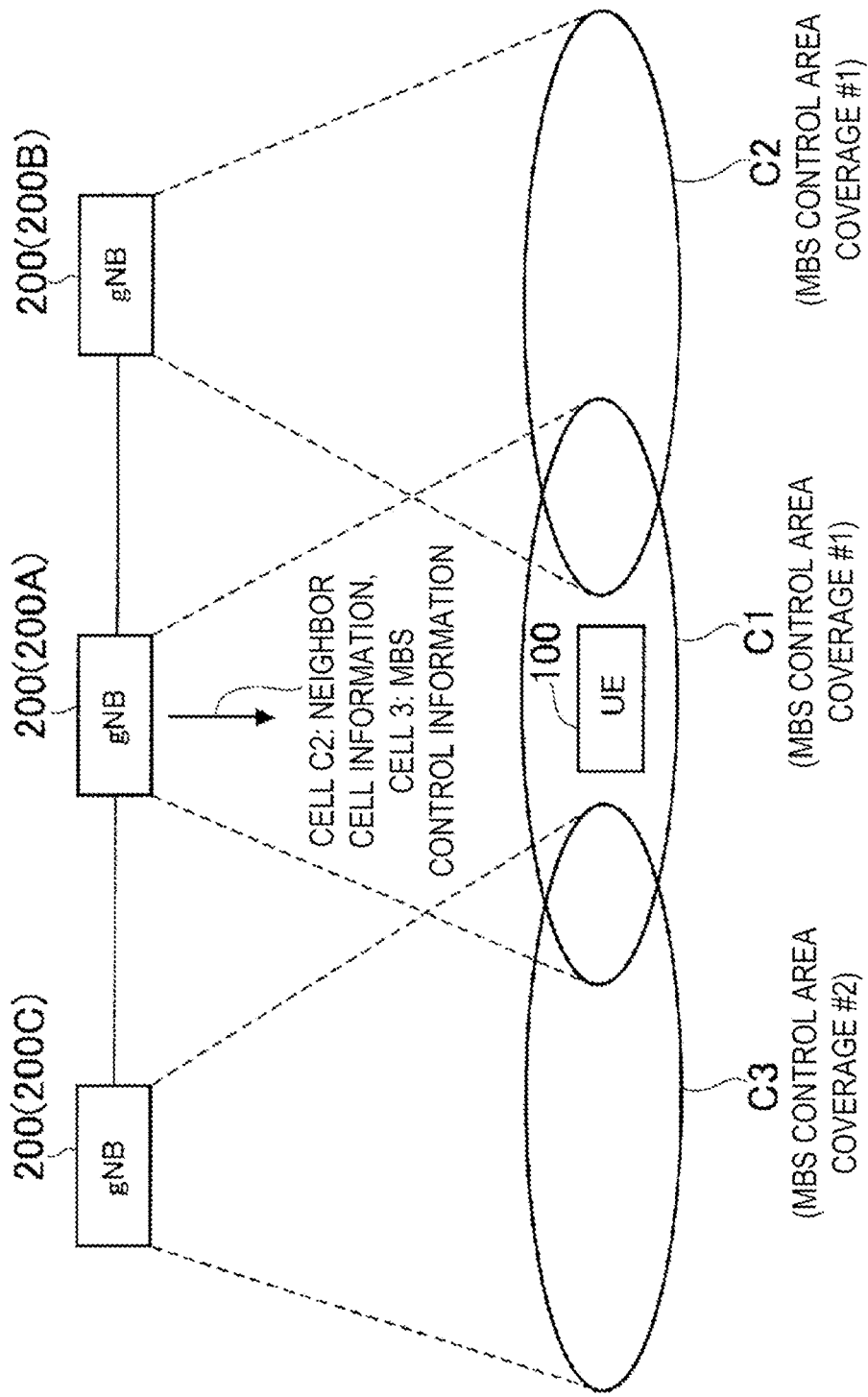
FIG. 10 is a diagram illustrating operations according to Variation 1.

FIG. 10 is a diagram illustrating operations according to Variation 1. FIG. 10 illustrates an example in which three cells are managed by different gNBs 200, but three cells may be managed by one gNB 200.

As illustrated in FIG. 10, the cell C1 and the cell C2 belong to the same MBS control area coverage #1, and the cell C3 belongs to an MBS control area coverage #2.

The gNB 200 (200A) managing the cell C1 transmits, in the cell C1, the neighbor cell information described above about the cell C2. Based on the neighbor cell information, the UE 100 in the cell C1 recognizes that the cell C2 belongs to the same MBS control area coverage #1 as the cell C1.

The gNB 200 (200A) managing the cell C1 transmits, in the cell C1, MBS control information about the cell C3 transmitted by the cell C3 on the MBS control channel. The gNB 200 (200A) may transmit, in the cell C1, at least a part of the neighbor cell information described above in association with the MBS control information of the cell C3. The gNB 200 (200A) may further transmit, in the cell C1, the MBS system information transmitted by the cell C3 on the broadcast control channel.

The UE 100 in the cell C1 receives the MBS control information of the cell C3 from the cell C1 for storage. Upon moving from the cell C1 to the cell C3, the UE 100 can promptly receive the MBS data from the cell C3 based on the stored MBS control information of the cell C3.

The gNB 200 (200A) managing the cell C1 may acquire the MBS control information (MBS control channel configuration) of cell C3 from the gNB 200 (200C) managing the cell C3 via the inter-base station interface. The gNB 200 (200A) may acquire the MBS control information of the cell C3 from the apparatus of the operator or the core network. The gNB 200 (200A) transmits, in the cell C1, the acquired MBS control information of the cell C3.

The gNB 200 (200A) managing the cell C1 may receive a notification of change of the control area identifier of the cell C3, from the gNB 200 (200C) managing the cell C3 via the inter-base station interface. The gNB 200 (200A) may receive the notification of change of the control area identifier of the cell C3, from the apparatus of the operator or the core network. The gNB 200 (200A) recognizes the change of the control area identifier of the cell C3 based on the received notification of change.

Note that in response to a request from the UE 100, the gNB 200 (200A) may transmit the MBS control information of the cell C3 in the cell C1. Specifically, the UE 100 transmits, to the gNB 200, a transmission request requesting the MBS control information transmitted in the neighbor cell (cell C3). In response to receiving the transmission request, the gNB 200 transmits the MBS control information of the cell C3 to the UE 100. Thus, the gNB 200 (200A) need not always periodically transmit, in the cell C1, the MBS control information of the cell C3, and is sufficient to transmit, in the cell C1, the MBS control information of the cell C3 when receiving a request from the UE 100. This can save the radio resources of the cell C1.

A random access preamble may be used as the transmission request. For example, the UE 100 transmits, to the gNB 200, a random access preamble using a Physical Random Access Channel (PRACH) resource selected by the UE 100 from among a plurality of PRACHs as a transmission request. Each of the plurality of PRACH resources is associated with at least one selected from the group consisting of the identifier of the neighbor cell, the MBS service identifier, and the identifier of MBS control channel.

Figure 11:
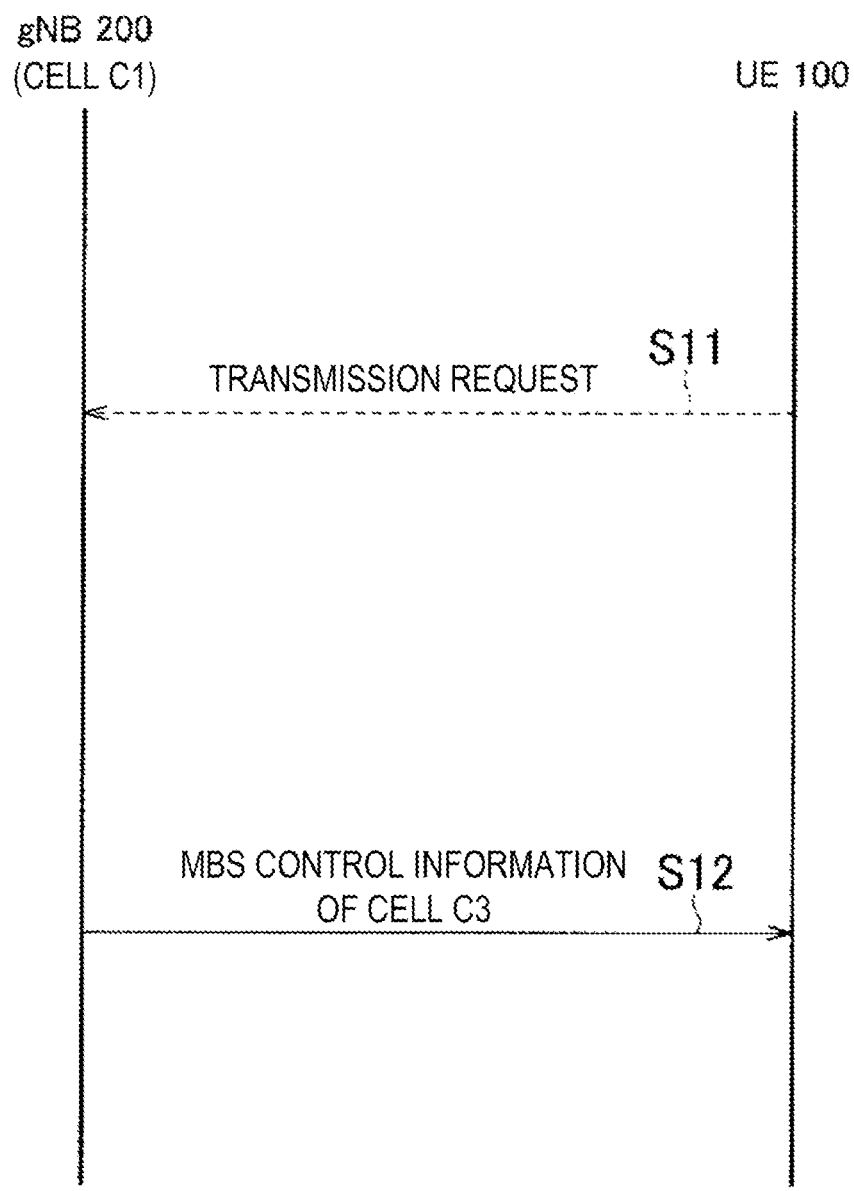
FIG. 11 is a diagram illustrating operations according to Variation 1.

FIG. 11 is a diagram illustrating operations according to Variation 1. In FIG. 11, dashed lines illustrate steps that are optional.

As illustrated in FIG. 11, in step S11, the UE 100 may transmit, to the gNB 200, a transmission request requesting transmission of the MBS control information of the neighbor cell. The UE 100 may request the gNB 200 to transmit the MBS system information of the neighbor cell in addition to the MBS control information of the neighbor cell.

The transmission request may include the MBS system information and/or the cell identifier of the neighbor cell of a request target of the MBS control channels and/or the frequency identifier. The transmission request may include the MBS system information and/or the control area identifier of a request target of the MBS control channels. When one neighbor cell includes a plurality of MBS control channels, the transmission request may include the MBS control channel identifier of a requested MBS control channel.

The UE 100 in the RRC idle state or the RRC connected state may transmit a random access preamble to the gNB 200 as a transmission request. The PRACH resources used for transmission of the random access preamble may be divided into sets for the respective neighbor cells, or for respective MBS service identifiers, or for respective control area identifiers. The information of such division is shared by the UE 100 and the gNB 200 in advance, and the UE 100 selects a PRACH resource corresponding to the request target and uses the PRACH source for transmission of the random access preamble. The transmission request may request all of the MBS control information of the neighbor cell.

In step S12, the gNB 200 transmits the MBS control channel of the neighbor cell (and/or the MBS system information of the neighbor cell) based on the transmission request from the UE 100. The transmission may be broadcast via the broadcast control channel or MBS control channel of the cell C1, or may be based on UE individual signaling (RRC message).

Variation 2

Variation 2 will be described while focusing on differences from the above-described embodiment.

Variation 2 is an example in which the UE 100 in the RRC idle state or the RRC inactive state is mainly assumed to perform MBS reception from the cell C1. In Variation 2, when the MBS control area coverage to which the cell C1 belongs is different from the MBS control area coverage to which the neighbor cell belongs, the UE 100 in the RRC idle state or the RRC inactive state transitions to the RRC connected state in the cell C1, and then acquires the MBS control information of the neighbor cell from the gNB 200.

Figure 12:
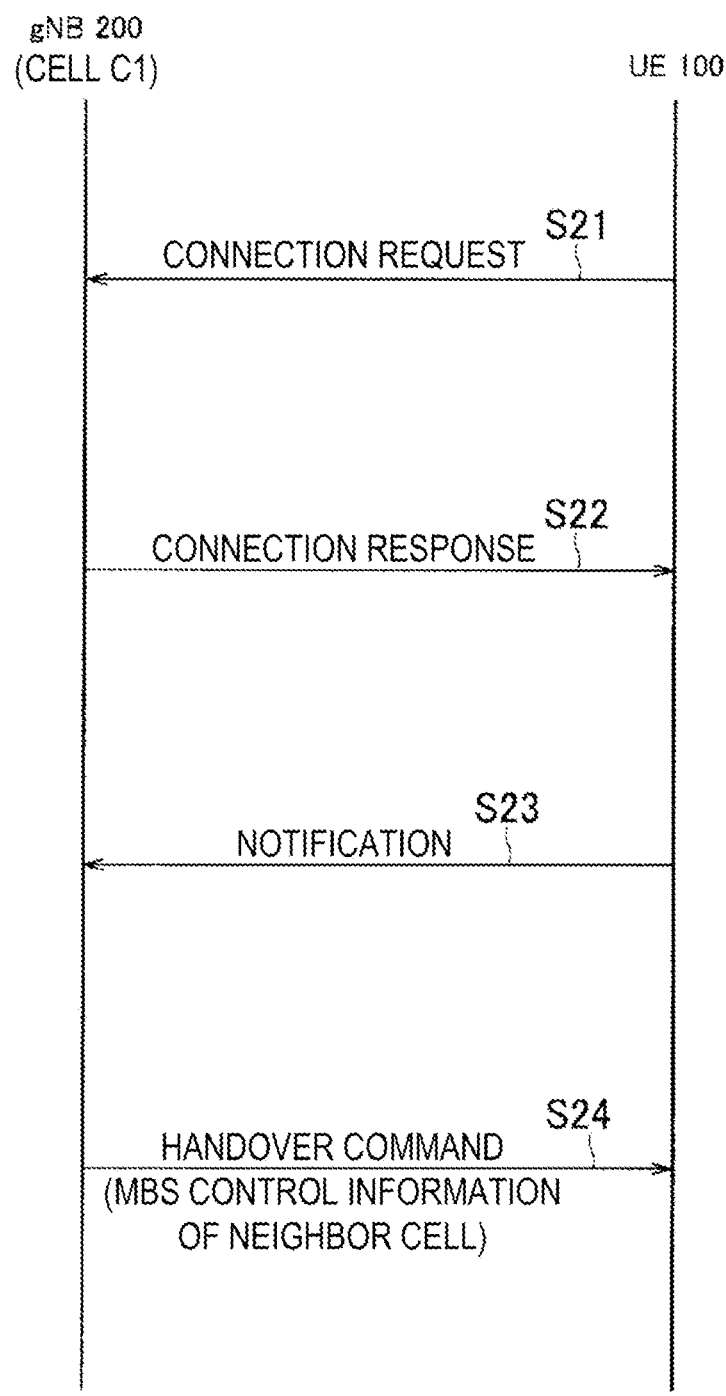
FIG. 12 is a diagram illustrating other operations according to Variation 1.

FIG. 12 is a diagram illustrating operations according to Variation 2.

As illustrated in FIG. 12, in step S21, the UE 100 performing the MBS reception in the RRC idle state or the RRC inactive state transmits a connection request message to the cell C1 prior to cell reselection from the cell C1 to the neighbor cell (cell C2 in this case). The transmission of the connection request message is triggered based on the radio condition of the cell C1 and/or cell C2. A threshold value for comparison to the radio condition may be configured by the cell C1 for the UE 100 in advance. Note that if the UE 100 is in the RRC idle state, the connection request message may be an RRC Request message that is a type of RRC message. If the UE 100 is in the RRC inactive state, the connection request message may be an RRC Resume Request message that is a type of RRC message.

In step S22, in response to receiving the connection request message, the gNB 200 managing the cell C1 transmits a connection response message to the UE 100. If the UE 100 is in the RRC idle state, the connection response message may be an RRC Setup message that is a type of RRC message. If the UE 100 is in the RRC inactive state, the connection response message may be an RRC Resume message that is a type of RRC message.

In step S23, the UE 100, which is to transition to the RRC connected state, transmits a notification message to the gNB 200. The UE 100 includes, in the notification message, MBS reception information indicating that the UE 100 is to perform the MBS reception. The UE 100 may include such MBS reception information in the connection request message in step S21. The MBS reception information may include the MBS service identifier of an MBS service to be received by the UE 100.

The UE 100 may include, in the notification message, measurement information indicating a measurement result for the neighbor cell (cell C2). The UE 100 may include such measurement information in the connection request message in step S21.

The notification message may be an RRC Setup Complete message (for the RRC idle state), or may be an RRC Resume Complete message (for the RRC inactive state). The notification message may be an MBS interest indication message that is a type of RRC message. The notification message may be a measurement report (measurement report message) described below.

In step S24, when the UE 100 satisfies handover criteria, the gNB 200 transmits, to the UE 100, a handover command message including the MBS control information of the neighbor cell (cell C2). The handover command message is a type of RRC message, and is a message for indicating handover to the UE 100.

Note that when the cell C1 and the cell C2 are managed by different gNBs 200, the gNB 200 (200A) managing the cell C1 transmits a handover request to the gNB 200 (200B) managing the cell C2 prior to step S24. The handover request may include information indicating that the UE 100 desires the MBS reception. In response to receiving the handover request, the gNB 200 (200B) managing the cell C2 transmits a handover response including the MBS control information of the cell C2 to the gNB 200 (200A) managing the cell C1. The gNB 200 (200A) managing the cell C1 transmits, to the UE 100, the handover command message including the MBS control information in the handover response.

In response to receiving the handover command message from the gNB 200, the UE 100 performs handover to the cell C2. After completing the handover, the UE 100 may transmit, to the cell C2, a notification that the UE 100 desires to transition to the RRC idle state or the RRC inactive state. As a result, in the cell C2, the UE 100 transitions from the RRC connected state to the RRC idle state or the RRC inactive state.

The UE 100 in the RRC connected state may be assumed to perform MBS reception from the cell C1. In this case, steps S21 and S22 in FIG. 12 are unnecessary.

With the measurement report, the UE 100 in the RRC connected state notifies the gNB 200 of a handover candidate cell belonging to the same MBS control area coverage as the cell C1, allowing the handover to the candidate cell to be performed. As a result, the UE 100 can promptly perform the MBS reception after the handover.

In other words, the UE 100 in the RRC connected state transmits, to the gNB 200, the measurement report based on whether the MBS control area coverage to which the cell C1 belongs is the same as the MBS control area coverage to which the neighbor cell belongs. Specifically, for each cell for which the UE 100 reports the measurement result to the gNB 200 by the measurement report, the UE 100 includes, in the measurement report, information concerning whether the MBS control area identifier is different (i.e., whether the MBS control information needs to be reacquired).

Firstly, the UE 100 in the RRC connected state measures each neighbor cell and checks whether the control area identifier of the neighbor cell is the same as the control area identifier of the serving cell (cell C1).

Here, the MBS control area identifier of the neighbor cell may be provided to the UE 100 from the serving cell (cell C1), or acquired by the UE 100 by reading the MBS system information of the neighbor cell.

Secondly, when the measurement report is triggered, the UE 100 transmits the measurement report message to the gNB 200 (cell C1).

Here, the UE 100 performing the MBS reception in the cell C1 gives information indicating that the control area identifier is the same identifier as that of the cell C1 and/or information indicating that the control area identifier is different from that of the cell C1 to the cell identifier of the neighbor cell for which the measurement report message includes the measurement result. Such information may indicate a neighbor cell suited for the MBS reception (i.e., a handover destination cell desired by the UE 100).

The UE 100 may include, in the measurement report message, only the measurement information (cell identifier and measurement result) of neighbor cells whose control area identifier is the same that of the cell C1. The UE 100 may include, in the measurement report message, only neighbor cells whose control area identifier is the same as that of the cell C1 and whose measurement result satisfies trigger conditions for the measurement report.

The gNB 200 managing the cell C1 determines the handover destination cell of the UE 100 based on the measurement report message from the UE 100. For example, the gNB 200 preferentially determines, as a handover destination cell, the neighbor cell whose control area identifier is the same as that of the cell C1.

Variation 3

Variation 3 will be described while focusing on differences from the above-described embodiment.

As described above, the MBS control information includes a list of scheduling information of the MBS traffic channel. The above-described embodiment assumes that the cells have perfectly matched MBS control information within the same MBS control area coverage. Variation 3 assumes that the cells have partially matched MBS control information. Specifically, in Variation 3, with the scheduling information of the MBS traffic channel in the MBS control information used as a unit, the MBS control area coverage is configured for each MBS traffic channel.

That is, in the embodiment described above, the control area identifier is configured for each MBS control channel, whereas in Variation 3, the control area identifier is configured for each piece of MBS traffic channel scheduling information (i.e., the MBS service identifier) in the MBS control channel (MBS control information).

For example, when a Single Frequency Network (SFN) is configured at the same frequency for a certain MBS service, the scheduling information of the MBS traffic channel corresponding to the MBS service needs to be the same among the cells within the SFN. For another MBS traffic channel, the scheduling is the same among the cells.

According to Variation 3, the gNB 200 transmits, via the MBS control channel, the MBS control information including the scheduling information of the MBS traffic channel and the control area identifier associated with the MBS traffic channel. Thus, compared to the above-described embodiment, Variation 3 allows the MBS control area range to be detailedly configured in such a manner that the MBS control area range is divided on a per MBS traffic channel basis.

Figure 13:
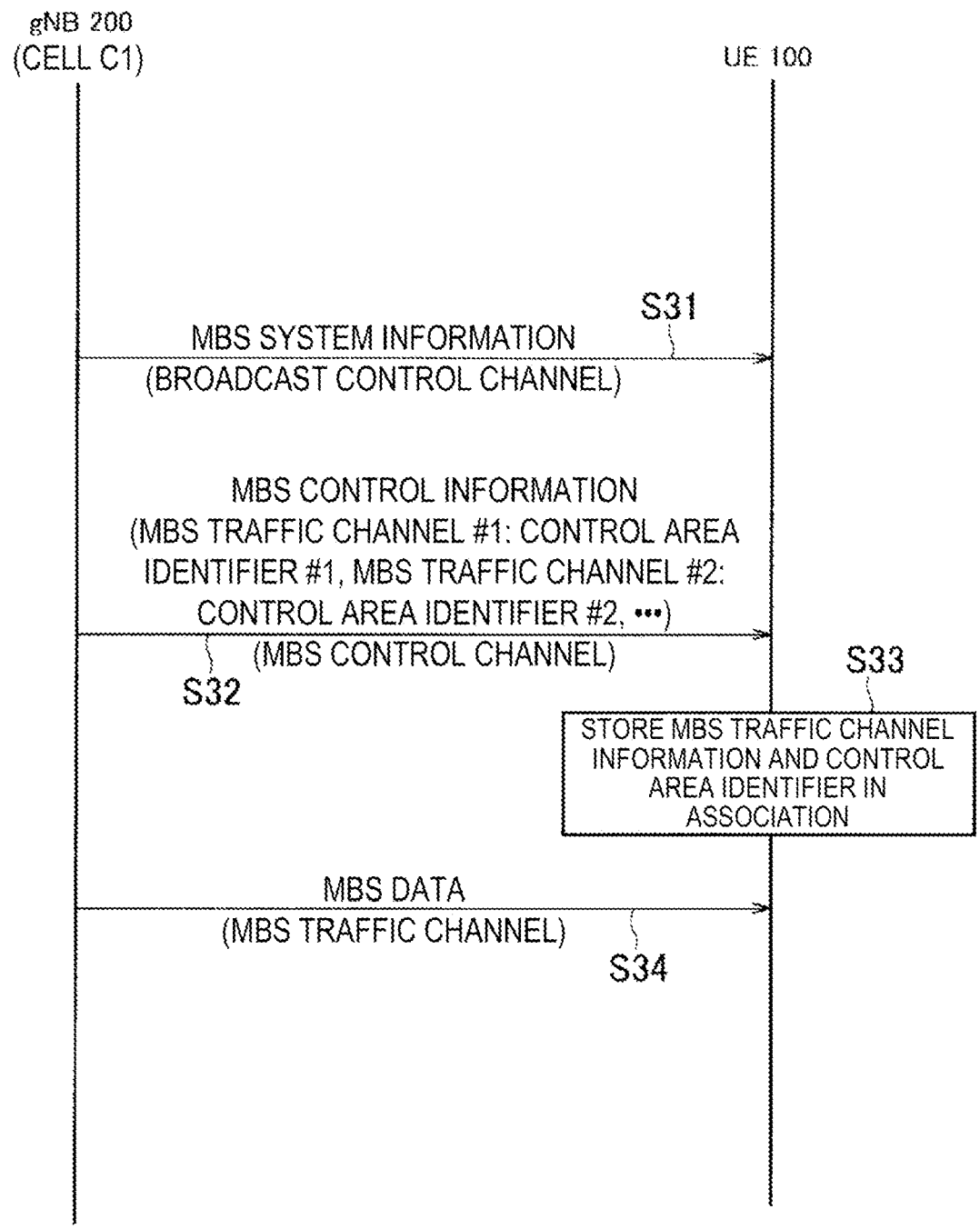
FIG. 13 is a diagram illustrating operations according to Variation 2.

FIG. 13 is a diagram illustrating operations according to Variation 3. Variation 3 will be described while focusing on differences from the above-described embodiment.

As illustrated in FIG. 13, in step S31, the gNB 200 managing the cell C1 transmits the MBS system information to the UE 100 via the broadcast control channel of the cell C1. The MBS system information includes scheduling information required for receiving the MBS control channel. The MBS system information may include the MBS control area configuration as in the above-described embodiment. The UE 100 recognizes the scheduling of the MBS control channel based on the MBS system information received from the gNB 200 in step S31.

In Variation 3, the MBS system information includes the MBS service identifier of each MBS traffic channel of the cell C1, and the control area identifier associated with the MBS service identifier.

In step S32, the gNB 200 transmits the MBS control information via the MBS control channel, with the scheduling in accordance with the MBS system information transmitted in step S31. The MBS control information includes a list of scheduling information for the MBS traffic channels. The MBS traffic channel is provided for each MBS service (MBS service identifier).

In Variation 3, the MBS control information includes the control area identifier for each MBS traffic channel. In the MBS control information, the control area identifier may be associated with one or more of the MBS service identifier, the group RNTI, and the MBS traffic channel scheduling information. The MBS control information may include information indicating a validity period of the control area identifier. The MBS control information may include information regarding neighbor cells (frequency identifier and cell identifier) corresponding to the same control area identifier. The control area identifier may be considered to be the identification number of the SFN.

In step S33, the UE 100 stores the MBS control information received from the gNB 200 in step S32. Specifically, the UE 100 receiving the MBS data of an MBS service stores the scheduling information of the MBS traffic channel corresponding to the MBS service along with the control area identifier associated with the MBS traffic channel. The UE 100 recognizes the scheduling of the MBS traffic channel corresponding to the MBS service in which the UE 100 takes interest, and attempts to receive the MBS traffic channel.

In step S34, the gNB 200 transmits the MBS data via the MBS traffic channel, with the scheduling in accordance with the MBS control information transmitted in step S32. The UE 100 receives the MBS data of the MBS traffic channel corresponding to the MBS service in which the UE 100 takes interest.

A case will be described below in which the UE 100 moves from the cell C1 to the neighbor cell (cell C2) (see FIGS. 8 and 9).

The UE 100 performing the MBS reception in the RRC idle state or the RRC inactive state acquires the MBS system information of the cell C2, and checks the MBS service identifier included in the MBS system information and the control area identifier for the MBS service identifier. Here, when the control area identifier corresponding to the MBS service identifier of the MBS service the UE 100 desires to receive matches the control area identifier of the MBS traffic channel (MBS service identifier) stored in advance, the UE 100 determines that the stored scheduling information of the MBS traffic channel is valid. In this case, the UE 100 can skip the reception of the MBS control information from the cell C2, and promptly receive the MBS data from the cell C2.

On the other hand, when the UE 100 is in the RRC connected state, the gNB 200 managing the cell C1 performs handover control for the UE 100. Regarding the MBS service identifier in which the UE 100 takes interest, when the control area identifier of the target cell (cell C2) is different, the gNB 200 (cell C1) transmits, to the UE 100, the MBS traffic channel scheduling information included in the MBS control information of the cell C2. Specifically, as in the case of Variation 2 described above, the gNB 200 includes, in the handover command message, the MBS traffic channel scheduling information included in the MBS control information of the cell C2.

Variation 4

Variation 4 will be described while focusing on differences from the above-described embodiment. Variation 4 is an example for configuring the SFN as described in Variation 3. In Variation 4, the gNB 200 transmits, to a neighbor gNB, a message for synchronous transmission of the same MBS data between a plurality of gNBs 200. That is, the gNBs 200 operate to configure the SFN in an autonomous distributed manner.

Figure 14:
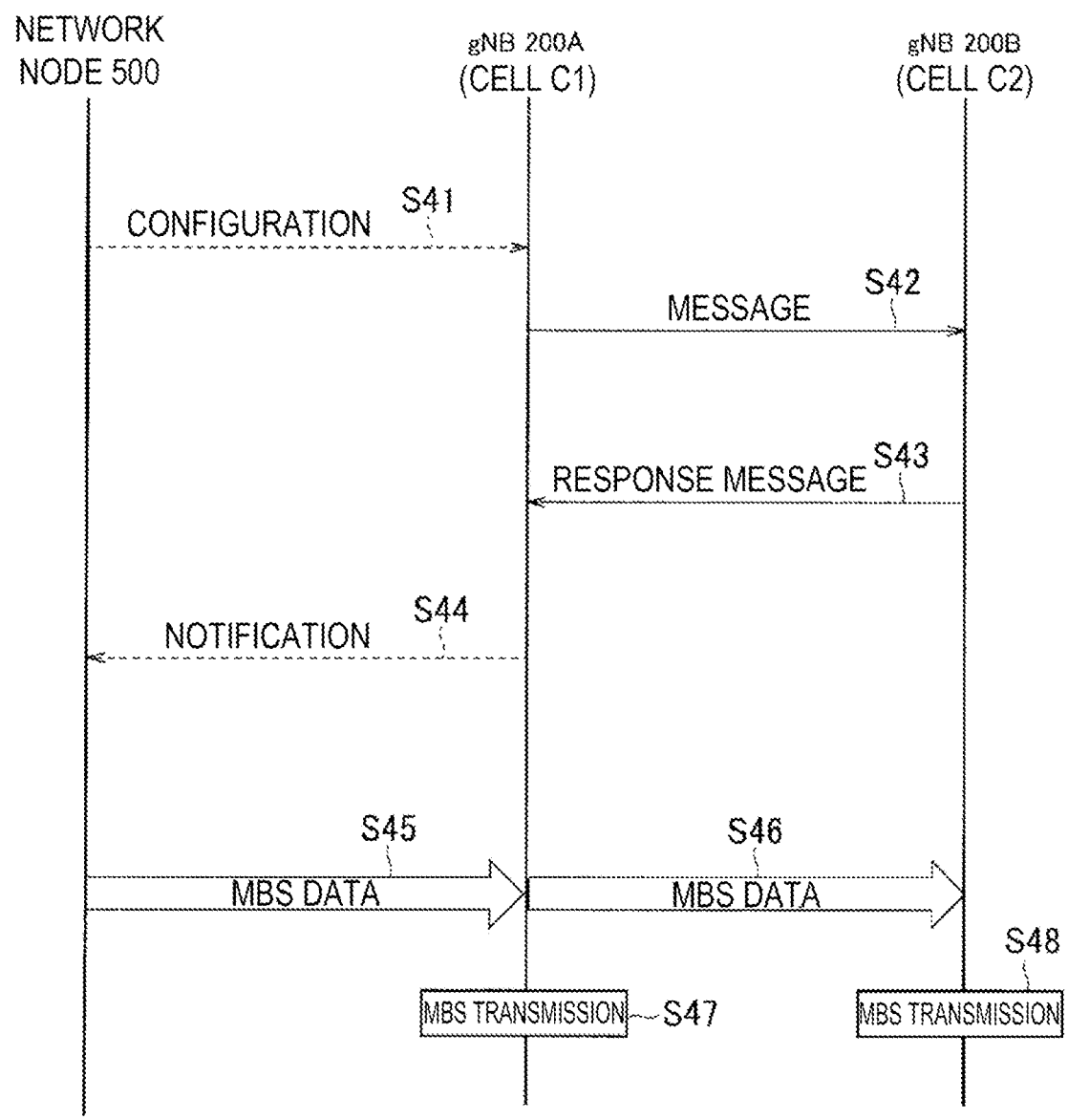
FIG. 14 is a diagram illustrating operations according to Variation 3.

FIG. 14 is a diagram illustrating operations according to Variation 4. A network node 500 illustrated in FIG. 14 refers to a group of apparatuses including the apparatuses of the core network and/or the apparatuses of the operator. Note that in FIG. 14, dashed lines illustrate operations that are optional.

As illustrated in FIG. 14, in step S41, the network node 500 configures, as an anchor for a certain MBS service, the gNB 200A managing the cell C1. Here, the network node 500 may transmit (configure), to the gNB 200A, the identifier of each cell (each gNB) constituting the SFN of a certain MBS service. The identifier may be notified in association with the MBS service identifier. Note that the gNB 200A may notify the network node 500 in advance of the capability of operating as an anchor.

In step S42, the gNB 200A transmits a message to request or configure an SFN configuration to the gNB 200B managing the cell C2 corresponding to the neighbor cell. The gNB 200B receives the message. The message may be transmitted and received via the inter-base station interface.

The message may include the configuration of the gNB 200A itself, or may include contents to be configured by the gNB 200B. For example, the message includes at least one of the following information elements related to the SFN.

MBS service identifier:

This identifier may further include an identifier indicating whether to configure the SFN.

Radio resource configuration:

Frequency resource information (e.g., carrier frequency number applied to the SFN, bandwidth part (BWP), PRB information (start PRB, PRB width))

Time resource information (e.g., system frame number to be applied to the SFN, subframe number, time period information (time to apply SFN (start time, end time, validity period))

MCS, transport block size, and/or transmitted data amount per subframe

System synchronization information for configuring the SFN:

Information of mapping between the absolute time (such as GPS time) and the system frame number (e.g., the information of correspondence or the value of offset between a certain time and system frame number "0"), or the value of system frame number offset between the gNB 200A and the gNB 200B Data synchronization information for configuring the SFN:

Information of mapping between the absolute time (such as GPS time) and the transmitted data sequence number (e.g., the information of correspondence or the value of offset between a certain time and transmitted data sequence number "0"), or information of mapping between the system frame number and the transmitted data sequence number (for example, the transmitted data sequence number or offset value corresponding to the system frame number "0"). Alternatively, the transmitted data amount per transmission occasion (subframe or the like).

Note that the above-described correspondence relationships may be expressed in reverse relationships. For example, the data synchronization information may be the system frame number corresponding to the transmitted data sequence number "0".

Group RNTI

Transport network configuration

Bearer identifier

Endpoint identifier of the gNB 200A (IP address, GTP tunnel identifier)

Endpoint identifier of the gNB 200B (IP address, GTP tunnel identifier)

In step S43, in response to the message in step S42, the gNB 200B transmits a response message to the gNB 200A. The gNB 200A receives the response message. The response message may include the configuration of the gNB 200B (the information elements described above), or may be simply a notification of configuration completion.

Here, when discrepancy occurs between the gNB 200A and the gNB 200B for the contents of the configuration (e.g., when a requested group RNTI has already been allocated), the gNBs 200 may negotiate.

An identifier space for the group RNTIs may be divided into a subspace for group RNTIs that can be freely allocated by the gNBs 200 and a subspace for group RNTIs coordinately used by the gNBs 200 (only the anchor can number the group RNTIs). For example, the identifier space may be divided in such a manner that groups RNTI #1 to RNTI #10 can be freely allocated, whereas the groups RNTI #11 to RNTI #20 are used for coordination. Alternatively, the neighbor gNBs 200 may periodically exchange information regarding the group RNTIs currently allocated.

In step S44, the gNB 200A notifies the network node 500 that all of the gNBs 200B constituting the SFN are completely configured.

After the SFN is configured, in step S45, the network node 500 transmits MBS data to the gNB 200A. The gNB 200A receives the MBS data. In step S46, the gNB 200A transfers the MBS data to the gNB 200B. Thus, the gNB 200A operates as a relay point (hub) of the user plane.

In step S47 and step S48, each of the gNB 200A and the gNB 200B (gNB 200 in the SFN) performs the MBS transmission in accordance with the above-described configuration.

Note that Variation 4 is premised on the SFN but that MBS data may be synchronously transmitted in cells with different frequencies. In this case, the SFN is not configured, but one or more of the gNBs 200 with different frequencies simultaneously transmit the same MBS data.

FIG. 14 illustrates an example in which the gNB 200B transmits the MBS data via the gNB 200A (steps S45 and S46); however, the present disclosure is not limited to this configuration. The gNB 200B may also receive the MBS data directly from the network node 500. In this case, the message in step S42 may notify the endpoint identifier (IP address or GTP tunnel identifier) of the network node 500. The response message in step S43 may notify the endpoint identifier (IP address or GTP tunnel identifier) of the network node 500.

Other Embodiments

The variations described above can be separately and independently implemented, and also be implemented in combination of two or more of the variations. The above-described variations need not necessarily be premised on the operations of the above-described embodiment.

A program causing a computer to execute each of the processes performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing the processes to be performed by the UE 100 or the gNB 200 may be integrated, and at least part of the UE 100 or the gNB 200 may be configured as a semiconductor integrated circuit (a chipset or an SoC).

Embodiments have been described above in detail with reference to the drawings, but specific configurations are not limited to those described above, and various design variation can be made without departing from the gist of the present disclosure.

SUPPLEMENTARY NOTE

Introduction

Revised work items have been approved that are related to NR multicast and broadcast services (MBS). The purposes of the work items are as follows.

Define broadcast/multicast RAN basic functions of the UE in the RRC connected state.

Define a group scheduling mechanism that allows the UE to receive broadcast/multicast services.

The purpose includes defining an extended function required to allow simultaneous operation with unicast reception.

Define support for dynamic change of broadcast/multicast service delivery between multicast (PTM) and unicast (PTP) with predefined UE service continuity.

Define support for basic mobility with service continuity.

On the assumption that the gNB-CU includes required adjustment functions (such as functions hosted by MCE), define changes required for RAN architectures and interfaces in consideration of the results of the SA2 SI in broadcast/multicast.

Define changes required to improve the reliability of broadcast/multicast services, for example, by UL feedback. The level of reliability is to be based on the requirements of the application/service provided.

Study support for the dynamic control of the broadcast/multicast transmission area in one gNB-DU and define what is required to enable the support, if any.

Define broadcast/multicast RAN basic functions of the UE in the RRC idle/RRC inactive state.

Define changes required to enable the UE in the RRC idle/RRC inactive state to receive Point to Multipoint transmission in order to maximize commonalities maintained between the RRC connected state and the RRC idle/RRC inactive state for configuration of PTM reception.

In the supplementary note, the first consideration for NR MBS will be discussed.

Discussion

General Considerations on Design

The LTE eMBMS involves several transmission schemes for enabling multicast/broadcast services, such as the MBSFN from Rel-9 and the SC-PTM from Rel-13. MBSFN transmission is primarily designed for multi-cell transmission, and simultaneous transmissions are performed in an MBSFN subframe (via the PMCH) within an MBSFN area. On the other hand, SC-PTM transmission focuses on single-cell transmission, and the MBMS is transmitted via the PDSCH. As illustrated in FIG. 6, from the perspective of Layer 2, MBSFN-related logical channels are mapped to MCHs, whereas SC-PTM-related logical channels are mapped to DL-SCHs.

Observation 1: In LTE, MCCHs and MTCHs are mapped to MCHs in the MBSFN transmission scheme, whereas SC-MCCHs and SC-MTCHs are mapped to DL-SCHs in the SC-PTM transmission scheme.

The WID has captured several limitations and assumptions, and this helps to consider what design is intended in the WI. The physical layer does not assume that new numerology or a new physical channel is introduced, as described below. This means that NR MBS-related logical channels are mapped to DL-SCHs.

Physical layer: The range of the WI is limited to the numerology, physical channels (PDCCH/PDSCH), and signals in the current Rel-15.

Observation 2: The range of the WI is limited to the existing numerology and physical channels (PDCCH/PDSCH). That is, NR MBS-related channels are assumed to be mapped to DL-SCHs.

Even if the MBSFN is not used, the multi-cell transmission will be supported by DL-SCHs in future releases, such as by a combination of, for example, of CoMP transmission and simultaneous delivery of user plane packets. Therefore, the DL-SCH conforms to the following limitations and assumptions.

Decisions on design made for the WI in Rel-17 does not interfere with the introduction of the following functions in future releases.

Support for standardization of the SFN in a plurality of cells beyond the gNB-DU level Observation 3: The DL-SCH (PDSCH) may be extended for multi-cell transmissions in future releases.

From the perspective of the above-described observations, the specifications of the SC-PTM that have been considered in LTE and cover not only the transmission schemes but also other mechanisms, such as configurations and service continuity may thus be good baselines for designing the NR MBS. Therefore, for the WI, RAN2 should reuse the existing specifications of the SC-PTM as much as possible, and study what is to be extended for the SC-PTM to support new/various use cases of the NR MBS.

Proposal 1: RAN2 should agree to employ the existing specifications of the LTE SC-PTM as baselines for design of the NR MBS such as a group scheduling mechanism, support for service continuity (for neighbor cell information and the like), and the interest indication of the UE.

Proposal 2: When Proposal 1 is agreed on, RAN2 should study what is to be extended in addition to the baselines for the SC-PTM to support new/various use cases assumed for the NR MBS.

In the next section, the specifications of the SC-PTM are used as baselines for the description. That is, Proposal 1 is assumed to be agreed on. Note that, even when a mechanism such as the MBSFN is introduced, the description can be reused.

Overview of Enhancements of functions for Control Plane

In the LTE SC-PTM, configurations are provided by two messages, i.e., SIB 20 and SC-MCCH. The SIB 20 provides SC-MCCH scheduling information, and the SC-MCCH provides SC-MTCH scheduling information including the G-RNTI and the TMGI, and neighbor cell information.

Figure 15:
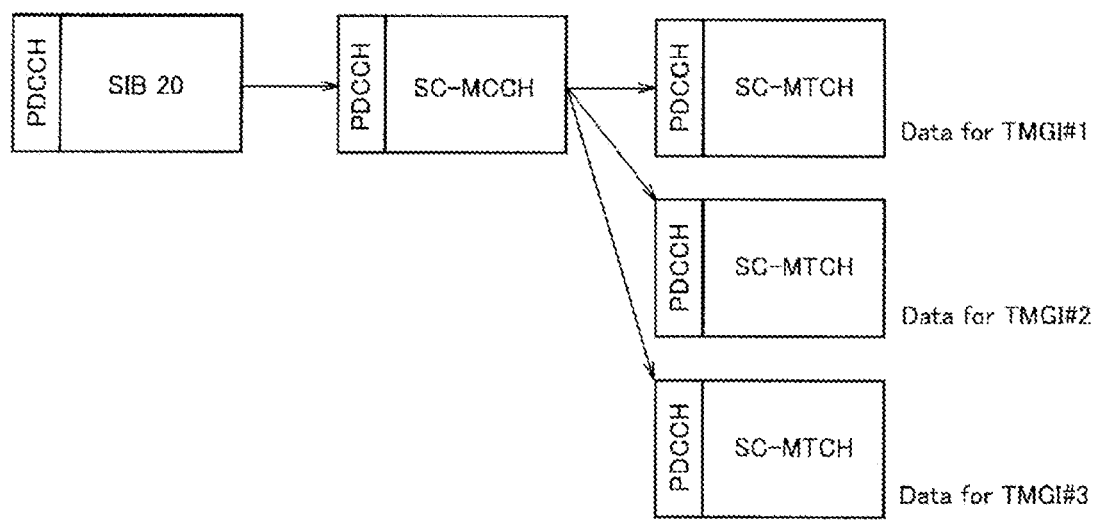
FIG. 15 is a diagram illustrating a two-stage configuration in LTE SC-PTM.

As illustrated in FIG. 15, an advantage of the LTE two-stage configuration is that the SC-MCCH scheduling is independent of the SIB 20 scheduling in terms of repetition period, duration, change period, and the like. The two-stage configuration facilitates frequent scheduling/update of the SC-MCCH, particularly for delay sensitive services and/or UE that is delayed in participating in the session. According to the WID, one of the applications is group communication or the like, and thus the facilitation also applies to the NR MBS.

Observation 4: In LTE, the two-stage configuration using the SIB 20 and the SC-MCCH is useful for different scheduling operations for these control channels. This is also useful for the NR MBS.

Proposal 3: RAN2 should agree on the two-stage configuration with different messages for the NR MBS, such as the SIB 20 and the SC-MCCH for the SC-PTM.

In addition to Proposal 3, the NR MBS is assumed to support various types of use cases described in the WID. It may be appreciated that the NR MBS should be appropriately designed for a variety of requirements ranging from delay sensitive applications such as mission critical applications and V2X to delay tolerant applications such as IoT, in addition to the other aspects of requirements ranging from lossless application such as software delivery to UDP type streaming such as IPTV.

Therefore, the design of the control channel should take into account flexibility and the resource efficiency of the control channel. Otherwise, for example, when one control channel includes configuration of a delay tolerant service and configuration of a delay sensitive service, the control channel needs to be frequently scheduled in order to satisfy delay requirements from the delay sensitive service. This may cause more signalling overheads.

An object A of the SA2 SI relates to enabling of general MBS services via 5GS, and specified use cases possible to receive benefits from this function include (but are not limited to) public safety, mission critical applications, V2X applications, transparent Ipv4/Ipv6 multicast delivery, IPTV, wireless software delivery, group communications, and IoT applications.

Observation 5: The NR MBS control channel needs to be flexible to various types of use cases and to have high resource efficiency.

These use cases may involve separate configuration channels. For example, one control channel frequently provides a delay sensitive service, and another control channel infrequently provides a delay tolerant service. The LTE SC-PTM is limited in that one cell includes only one SC-MCCH. However, the NR MBS may assume more use cases than LTE, and thus should be devoid of such limitation. When a plurality of SC-MCCHs are allowed within the cell, each SC-MCCH includes a scheduling configuration with a different repetition period which can be optimized for a specific service. How to identify the SC-MCCH that provides a service in which the UE takes interest needs further study.

Proposal 4: RAN2 should discuss whether the NR MBS cell supports a plurality of control channels, as is the case with a plurality of SC-MCCHs the support of which is not included in LTE.

A new paradigm of NR is support for on-demand SI transmission. This concept may be reused for the SC-MCCH in the NR MBS, i.e., on-demand SC-MCCH. For example, the SC-MCCH for delay tolerant services is provided on demand, thus enabling resource consumption for signalling to be optimized. Of course, the network includes another option for providing the SC-MCCH for delay sensitive services and the like, periodically, i.e., not based on a demand.

Proposal 5: RAN2 should discuss an option provided when the control channel is provided on an on-demand basis, as is the case with the on-demand SC-MCCH that is not included in LTE.

Figure 16:
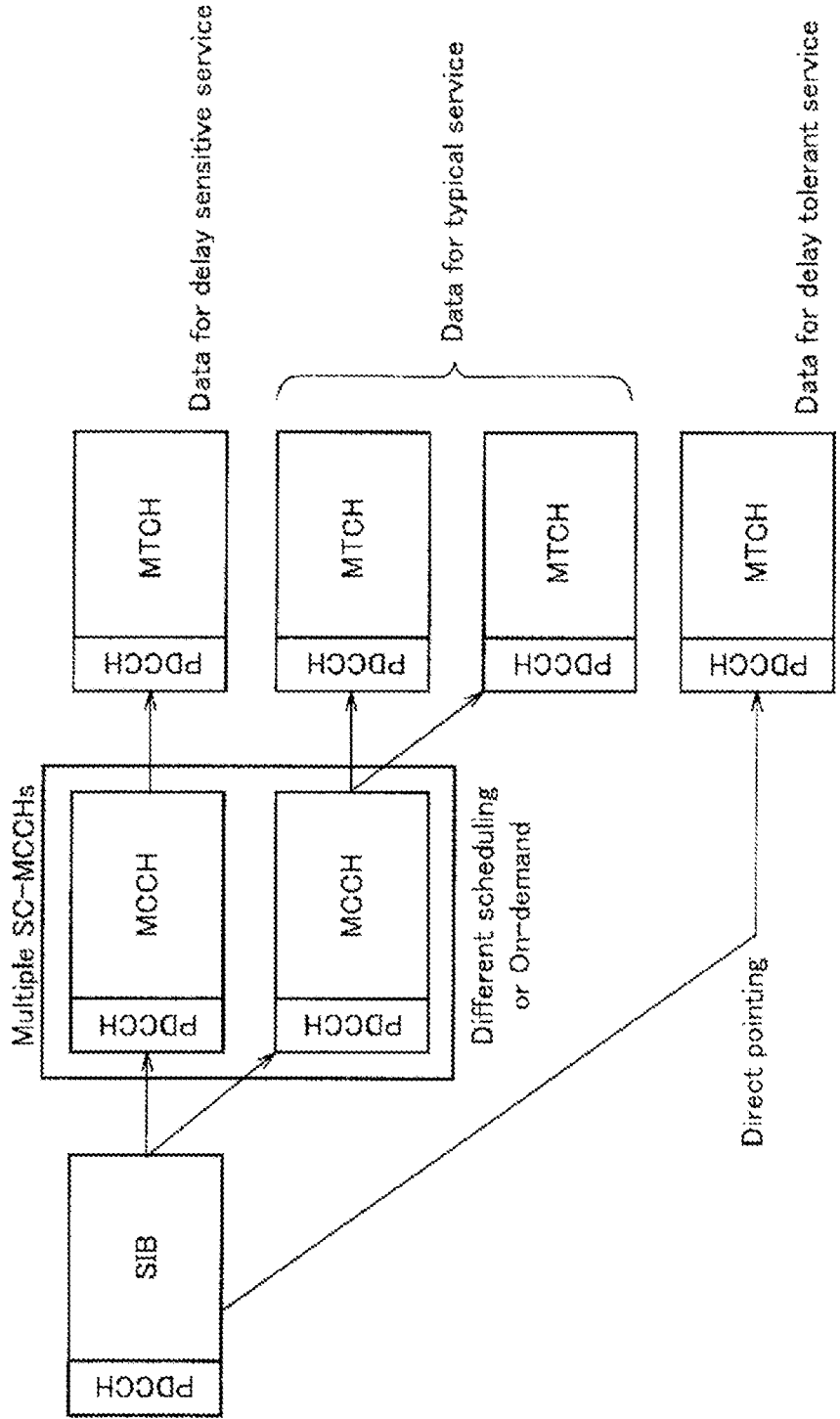
FIG. 16 is a diagram illustrating enhancements of functions for an NR MBS.

As another possibility, merging the above-described messages, i.e., one-stage configuration, may be further studied. For example, as illustrated in FIG. 16, the SIB provides SC-MTCH scheduling information directly, i.e., without the SC-MCCH. This will provide optimization for delay tolerant services and/or power sensitive UE. For example, the UE may request the SIB (on demand), and the gNB may start providing the SIB and the corresponding service after requests from a plurality of Ues. These Ues do not need to monitor the SC-MCCH that is repeatedly broadcast.

Proposal 6: RAN2 should discuss options such as direct provision of the traffic channel configuration in the SIB when multicast reception with no use of the SC-MCCH (i.e., one-stage configuration) is supported.

Overview of User Plane Extension

Figure 17:
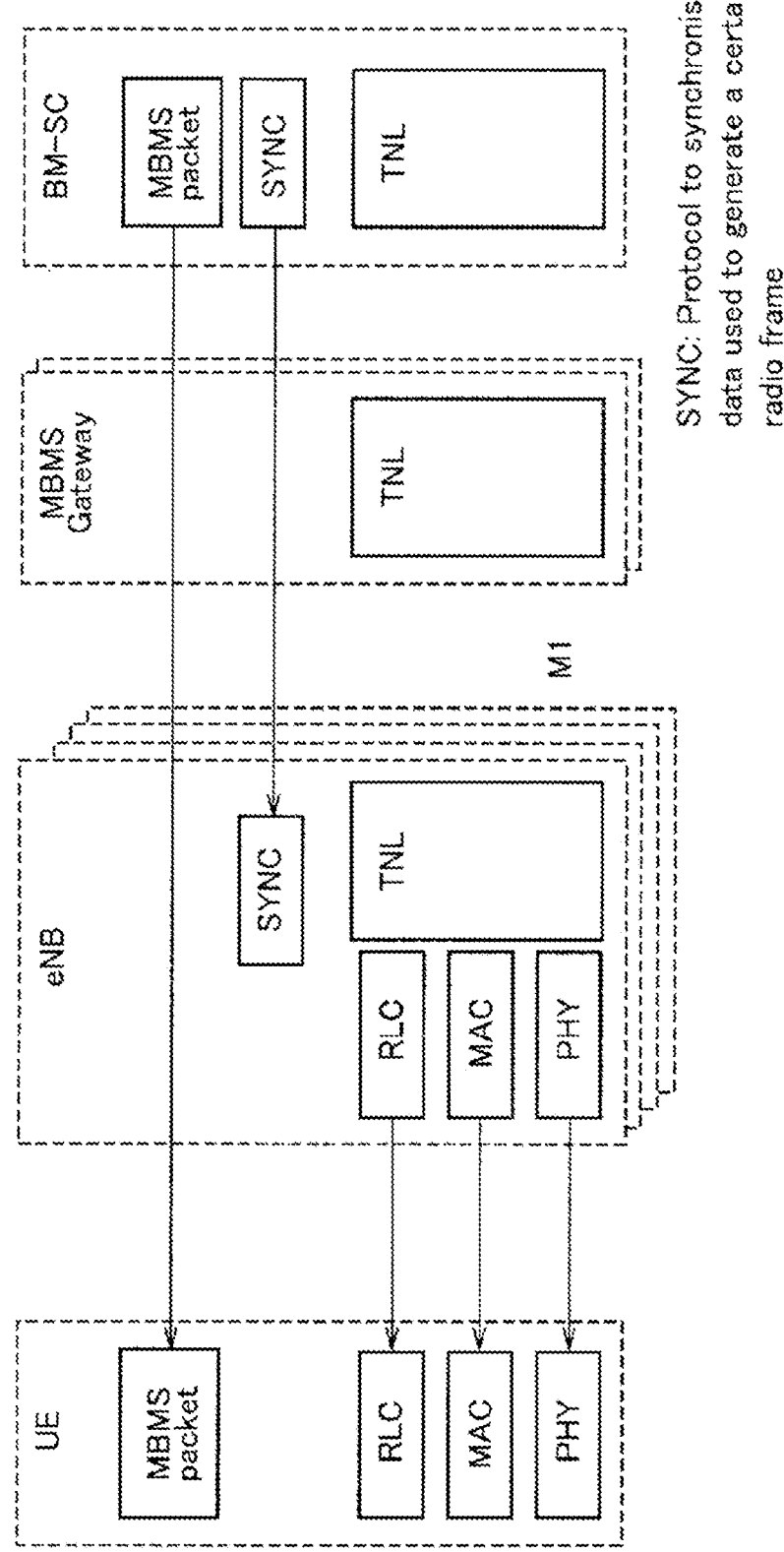
FIG. 17 is a diagram illustrating a U-plane architecture of the LTE MBMS.

In the LTE eMBMS, regardless of the MBSFN or the SC-PTM, the Uu protocol stack includes no PDCP layer as illustrated in FIG. 17. One transmission is allowed for each logical channel, i.e., only the UM mode is used in the RLC layer, and no blind retransmission is used in the HARQ. In other words, retransmission of lost packets is dependent on the upper layer mechanism in the LTE eMBMS.

Observation 6: In the LTE eMBMS, the retransmission scheme is not supported in the AS layer.

On the other hand, the NR MBS may require a more reliable, flexible transmission scheme introduced as an AS function, as cited from the following WID.

Define support for dynamic change of broadcast/multicast service delivery between multicast (PTM) and unicast (PTP) with predefined UE service continuity.

Define support for basic mobility with service continuity.

Define changes required to improve the reliability of broadcast/multicast services, for example, by UL feedback. The level of reliability should be based on the requirements of the application/service provided.

Observation 7: The NR MBS may require several enhancements of functions for improving the reliability and flexibility of multicast transmission and reception as a function of the AS layer.

Group cast retransmission may be considered to be processed by using MAC (HARQ), RLC (ARQ), and/or the PDCP (status report). Similarly to the Uu, these mechanisms may help compensation for degraded UE mobility, i.e., degraded radio quality and/or lost packets due to switching of a transport path.

The multicast/groupcast HARQ feedback has not been introduced in LTE. On the other hand, in Rel-16 NR V2X, the sidelink groupcast HARQ feedback, that is, the ACK/NACK or NACK-only, is supported. This is one possibility to be reused to improve the performance of the NR MBS. The detailed decision ultimately depends on RAN1, but RAN2 may discuss the usefulness of HARQ feedback/retransmission for improving the reliability of multicast reception at the UE in the idle, inactive, and connected states.

Proposal 7: RAN2 should discuss whether the HARQ feedback/retransmission is useful for the NR MBS multicast for the UE in the RRC idle, inactive, and connected states.

For unicast, the HARQ and the ARQ support a double feedback loop to improve the reliability of reception. When this also applies to the groupcast in the NR MBS, as a possibility, a method for introducing the ARQ, i.e., the RLC AM mode should be discussed at least to improve the reliability of the UE in the connected state. However, it may be typically assumed that a pair of uplink channels is not available for groupcast. Therefore, a potential challenge is a method for the UE to transmit feedback (STATUS PDU) to the gNB.

Proposal 8: RAN2 should discuss whether the NR MBS multicast supports the RLC AM mode at least for the UE in the RRC connected state.

Figure 18:
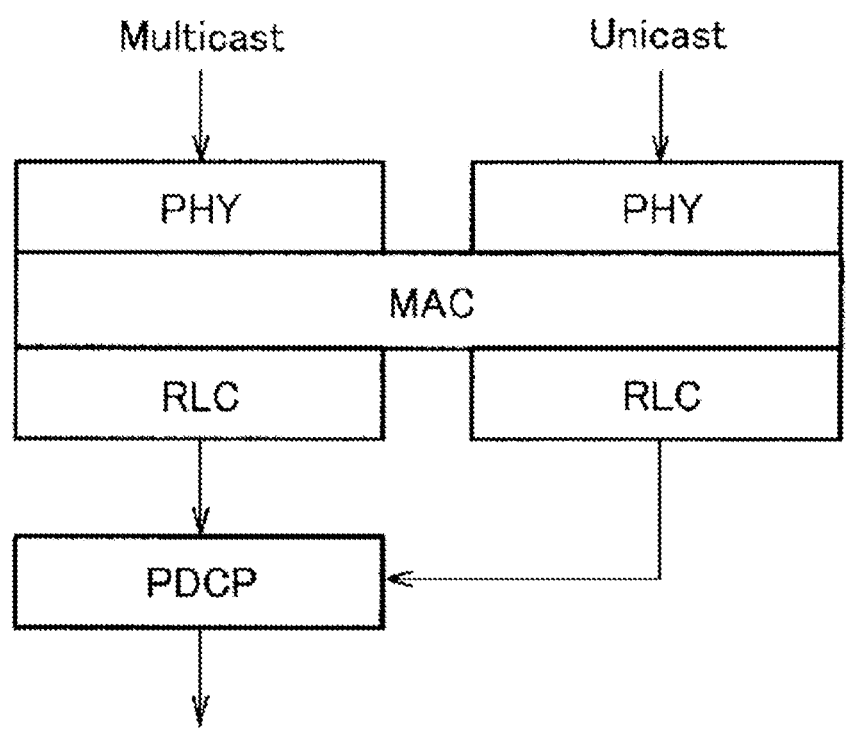
FIG. 18 is a diagram illustrating enhancements of functions for reliable reception and multicast/unicast switching.

For example, when lossless delivery needs to be taken into account during handover of the NR MBS, as in the use case of software delivery, the PDCP helps recover dropped packet as in the current case. FIG. 18 illustrates enhancements of functions for reliable reception and multicast/unicast switching. Support for the PDCP layer has another advantage that a multicast bearer can be configured by using split bearers and/or duplicated by using a unicast bearer. This is also one of the potential mechanisms of the "dynamic change of broadcast/multicast service delivery between multicast (PTM) and unicast (PTP) with predefined UE service continuity" as described in the WID. Whether multicast reception can support a variety of PDCP functions such as header compression and encryption needs further studies.

Proposal 9: RAN2 should discuss whether the PDCP layer is supported at least by the NR MBS groupcast in the UE in the RRC connected state.

Finally, whether the NR MBS protocol stack requires the SDAP should be studied. NR supports the SDAP layer and processes a QoS flow in the radio bearer. On the other hand, the SDAP layer is not included in the known LTE, and thus not included in the eMBMS. Although the SDAP layer may be assumed not to affect reception of multicast data, the need for the SDAP layer may actually depend on the assumptions/requirements of the upper layer. Accordingly, for the necessity, RAN2 may need to wait for the other WGs to proceed.

Observation 8: RAN2 may need to check with the other WGs whether the NR MBS requires the SDAP layer.

The invention claimed is:

1. A communication control method used in a mobile communication system for providing a multicast broadcast service (MBS) from a base station to a user equipment, the communication control method comprising:
    transmitting, by the base station configured to manage a cell, to the user equipment via an MBS control channel of the cell, MBS control information used to receive MBS data;
    transmitting, by the base station to the user equipment, a control area identifier indicating an MBS control area coverage corresponding to an area coverage where at least a part of the MBS control information is applicable; and
    when the MBS control area coverage to which the cell belongs is different from the MBS control area coverage to which a neighbor cell belongs, acquiring, by the user equipment, MBS control information of the neighbor cell from the base station.

2. The communication control method according to claim 1, further comprising:
    storing, by the user equipment, the MBS control information and the control area identifier from the base station; and
    within the MBS control area coverage indicated by the control area identifier stored, receiving, by the user equipment, the MBS data based on the MBS control information stored.

3. The communication control method according to claim 1, wherein
    the transmitting the control area identifier comprises transmitting, via a broadcast control channel, MBS system information comprising the control area identifier.

4. The communication control method according to claim 1, further comprising:
    transmitting, by the base station, to the user equipment, neighbor cell information to determine whether a neighbor cell different from the cell belongs to the MBS control area coverage.

5. The communication control method according to claim 1, further comprising:
    when the MBS control area coverage to which the cell belongs is different from the MBS control area coverage to which a neighbor cell belongs, transmitting, by the base station, in the cell, MBS control information transmitted in the neighbor cell.

6. The communication control method according to claim 1, further comprising:
   transmitting, by the user equipment, to the base station, a transmission request requesting the MBS control information transmitted in the neighbor cell; and
   transmitting, by the base station, to the user equipment, the MBS control information in response to receiving the transmission request.

7. The communication control method according to claim 6, wherein
   the transmitting the transmission request comprises transmitting, to the base station, a random access preamble using a Physical Random Access CHannel (PRACH) resource selected by the user equipment from among a plurality of PRACH resources as the transmission request; and
   each of the plurality of PRACH resources is associated with at least one selected from the group consisting of an identifier of a neighbor cell, an MBS service identifier, and an identifier of MBS control channel.

8. The communication control method according to claim 1, further comprising:
   transmitting, by the user equipment in a Radio Resource Control (RRC) connected state, to the base station, a measurement report based on whether the MBS control area coverage to which the cell belongs is identical to the MBS control area coverage to which a neighbor cell belongs.

9. The communication control method according to claim 1, wherein
   the transmitting the MBS control information comprises transmitting the MBS control information comprising scheduling information of an MBS traffic channel and the control area identifier associated with the MBS traffic channel.

10. The communication control method according to claim 1, further comprising:
    transmitting, by the base station, to a neighbor base station, a message that allows the base station and the neighbor station to perform synchronous transmission of identical MBS data.

11. A base station used in a mobile communication system for providing a multicast broadcast service (MBS), the base station comprising a processor configured to perform operations comprising:
    transmitting MBS control information used to receive MBS data to a user equipment via an MBS control channel of a cell of the base station;
    transmitting, to the user equipment, a control area identifier indicating an MBS control area coverage corresponding to an area coverage where at least a part of the MBS control information is applicable; and
    when the MBS control area coverage to which the cell belongs is different from the MBS control area coverage to which a neighbor cell belongs, transmitting, to the user equipment, MBS control information of the neighbor cell.

12. A user equipment used in a mobile communication system for providing a multicast broadcast service (MBS), the user equipment comprising a processor configured to perform operations comprising:
    receiving, via an MBS control channel of a cell, MBS control information used to receive MBS data;
    receiving, from the cell, a control area identifier indicating an MBS control area coverage corresponding to an area coverage where at least a part of the MBS control information is applicable;
    storing the MBS control information and the control area identifier from the cell;
    receiving the MBS data based on the MBS control information stored, within the MBS control area coverage indicated by the control area identifier stored; and
    when the MBS control area coverage to which the cell belongs is different from the MBS control area coverage to which a neighbor cell belongs, acquiring MBS control information of the neighbor cell from the cell.

* * * * *